US012533291B2

(12) United States Patent
Jeppsson et al.

(10) Patent No.: US 12,533,291 B2
(45) Date of Patent: Jan. 27, 2026

(54) ADJUSTABLE PISTON

(71) Applicant: PHYSIO-CONTROL, INC., Redmond, WA (US)

(72) Inventors: Anders Jeppsson, Lund (SE); Wiktor Kocula, Löderup (SE); Jonas Lagerstrom, Fagersanna (SE); Per Axelsson, Åkarp (SE); Marcus Ehrstedt, Kävlinge (SE); Anders Nilsson, Lund (SE); Tobias Svahn, Malmö (SE); Lars Anders Jörgen Segerstein, Staffanstorp (SE)

(73) Assignee: PHYSIO-CONTROL, INC., Redmond, WA (US)

( * ) Notice: Subject to any disclaimer, the term of this patent is extended or adjusted under 35 U.S.C. 154(b) by 1065 days.

(21) Appl. No.: 17/564,043

(22) Filed: Dec. 28, 2021

(65) Prior Publication Data

US 2022/0117839 A1 Apr. 21, 2022

Related U.S. Application Data

(63) Continuation-in-part of application No. 16/138,677, filed on Sep. 21, 2018, now Pat. No. 11,246,796, (Continued)

(51) Int. Cl.
*A61H 31/00* (2006.01)

(52) U.S. Cl.
CPC ......... *A61H 31/007* (2013.01); *A61H 31/005* (2013.01); *A61H 31/006* (2013.01); (Continued)

(58) Field of Classification Search
CPC ...... A61H 31/00–008; A61H 2031/001; A61H 2031/002; A61H 2031/003; (Continued)

(56) References Cited

U.S. PATENT DOCUMENTS

| | | | |
|---|---|---|---|
| 1,193,476 | A | 8/1916 | Block |
| 2,067,268 | A | 1/1937 | Hans |

(Continued)

FOREIGN PATENT DOCUMENTS

| | | | |
|---|---|---|---|
| EP | 0623334 | A1 | 11/1994 |
| EP | 0509773 | A1 | 1/1998 |

(Continued)

OTHER PUBLICATIONS

Chamberlain et al.; "Time for Change?" Resuscitation vol. 58 Issue 3; 2003 pp. 237-247.

(Continued)

*Primary Examiner* — Valerie L Woodward
(74) *Attorney, Agent, or Firm* — Miller Nash LLP

(57) ABSTRACT

Techniques and devices for extending a piston and/or compression unit, for example connected to a medical device such as a mechanical CPR device, to accommodate different sized patients, are described herein. In some cases, a piston of a mechanical CPR device may include an inner piston at least partially slidable into an external piston sleeve. In one aspect, some aspects, the piston includes sleeves which can move relative to each other to extend the piston. In additional aspects, the compression mechanism may also extend downward toward the patient. In all aspects, the change in length of the piston may be detected and used to modify movement of the piston, for example to more safely perform mechanical CPR.

18 Claims, 26 Drawing Sheets

Related U.S. Application Data which is a continuation-in-part of application No. 15/982,729, filed on May 17, 2018, now Pat. No. 11,020,312, which is a continuation of application No. 14/573,995, filed on Dec. 17, 2014, now Pat. No. 10,004,662.

(60) Provisional application No. 63/184,687, filed on May 5, 2021, provisional application No. 62/009,109, filed on Jun. 6, 2014.

(52) U.S. Cl.
CPC .................. *A61H 2031/001* (2013.01); *A61H 2201/0192* (2013.01); *A61H 2201/123* (2013.01); *A61H 2201/1246* (2013.01); *A61H 2201/1619* (2013.01); *A61H 2201/1623* (2013.01); *A61H 2201/5058* (2013.01); *A61H 2201/5061* (2013.01); *A61H 2201/5064* (2013.01); *A61H 2201/5069* (2013.01); *A61H 2201/5092* (2013.01); *A61H 2205/084* (2013.01)

(58) Field of Classification Search
CPC ...... A61H 2009/0064; A61H 2205/084; A61H 2201/013; A61H 2201/0192; A61H 2201/1246; A61H 2201/1664; A61H 2201/5064
See application file for complete search history.

(56) References Cited

U.S. PATENT DOCUMENTS 2,071,215 A 2/1937 Petersen
2,195,744 A 4/1940 Emerson
3,060,925 A 10/1962 Honsaker et al.
3,219,031 A * 11/1965 Rentsch, Jr. ......... A61H 31/007 601/41
3,364,924 A 1/1968 Barkalow
3,374,783 A 3/1968 Hurvitz
3,425,409 A 2/1969 Isaacson et al.
3,451,072 A 6/1969 Cogdell
3,489,140 A 1/1970 Mullikin
3,509,899 A 5/1970 Hewson
3,512,522 A 5/1970 Greenlee et al.
3,612,359 A 10/1971 Sundholm
3,644,943 A 2/1972 Parodi fu Leonardo et al.
3,739,771 A * 6/1973 Gaquer ................ A61H 31/008 601/41
3,782,371 A 1/1974 Derouineau
3,985,126 A 10/1976 Barkalow
4,004,579 A 1/1977 Dedo
4,059,099 A 11/1977 Davis
4,060,079 A 11/1977 Reinhold, Jr.
4,098,597 A 7/1978 Nebelung
4,198,963 A 4/1980 Barkalow et al.
4,273,114 A 6/1981 Barkalow et al.
4,326,507 A 4/1982 Barkalow
4,338,924 A 7/1982 Bloom
4,349,015 A 9/1982 Alferness
4,361,140 A 11/1982 Barkalow
4,397,306 A 8/1983 Weisfeldt et al.
4,424,806 A 1/1984 Newman et al.
4,570,615 A 2/1986 Barkalow
4,610,254 A 9/1986 Morgan et al.
4,770,164 A 9/1988 Lach et al.
4,819,627 A 4/1989 Connors
4,895,173 A 1/1990 Brault et al.
4,915,095 A * 4/1990 Chun .................. A61H 31/008 601/43
4,928,674 A 5/1990 Halperin et al.
5,003,982 A 4/1991 Halperin
5,014,374 A 5/1991 Williams
5,056,505 A 10/1991 Warwick et al.
5,098,369 A 3/1992 Heilman et al.
5,176,135 A 1/1993 Fain et al.
5,184,606 A 2/1993 Csorba
5,217,010 A 6/1993 Tsitlik et al.
5,222,478 A 6/1993 Scarberry et al.
5,243,975 A 9/1993 Alferness et al.
5,257,619 A 11/1993 Everete
5,287,846 A 2/1994 Capjon et al.
5,295,481 A 3/1994 Geeham
5,327,887 A * 7/1994 Nowakowski ...... A61M 16/024 128/202.13
5,330,526 A 7/1994 Fincke et al.
5,399,148 A 3/1995 Waide et al.
5,405,362 A 4/1995 Kramer et al.
5,454,779 A 10/1995 Lurie et al.
5,474,533 A 12/1995 Ward et al.
5,487,722 A 1/1996 Weaver, II et al.
5,490,820 A 2/1996 Schock et al.
5,520,683 A 5/1996 Subramaniam et al.
5,549,659 A 8/1996 Johansen et al.
5,557,049 A 9/1996 Ratner
5,564,416 A 10/1996 Jones
5,630,789 A 5/1997 Schock et al.
5,634,222 A 6/1997 Zwickey
5,634,886 A 6/1997 Bennett
5,645,522 A 7/1997 Lurie et al.
5,657,751 A 8/1997 Karr, Jr.
5,664,563 A 9/1997 Schroeder et al.
5,716,380 A 2/1998 Yerkovich et al.
5,738,637 A 4/1998 Kelly et al.
5,743,864 A 4/1998 Baldwin
5,755,275 A 5/1998 Rose et al.
5,769,800 A 6/1998 Gelfand et al.
5,772,613 A 6/1998 Gelfand et al.
D399,000 S 9/1998 Rothman et al.
5,806,512 A 9/1998 Abramov et al.
5,833,711 A 11/1998 Schneider
5,891,062 A 4/1999 Schock et al.
5,913,837 A 6/1999 Smith
5,997,488 A 12/1999 Gelfand et al.
6,021,349 A 2/2000 Arand et al.
6,059,750 A 5/2000 Fogarty et al.
6,066,106 A 5/2000 Sherman et al.
6,090,056 A 7/2000 Bystrom et al.
6,125,299 A 9/2000 Groenke et al.
6,142,962 A 11/2000 Mollenauer et al.
6,149,670 A 11/2000 Worthen et al.
6,155,257 A 12/2000 Lurie et al.
6,171,267 B1 1/2001 Baldwin, II
6,174,295 B1 1/2001 Cantrell et al.
6,179,793 B1 1/2001 Rothman et al.
6,213,960 B1 4/2001 Sherman et al.
6,234,984 B1 5/2001 Kelly et al.
6,259,949 B1 7/2001 Rosborough et al.
6,263,238 B1 7/2001 Brewer et al.
6,277,143 B1 8/2001 Klatz et al.
6,312,399 B1 11/2001 Lurie et al.
6,325,771 B1 12/2001 Kelly et al.
6,334,070 B1 12/2001 Nova et al.
6,351,671 B1 2/2002 Myklebust et al.
6,374,827 B1 4/2002 Bowden et al.
6,390,996 B1 5/2002 Halperin et al.
6,397,843 B1 6/2002 Tien-Tsai
6,398,744 B2 6/2002 Bystrom et al.
6,398,745 B1 6/2002 Sherman et al.
D461,008 S 7/2002 Hampf et al.
6,447,465 B1 9/2002 Sherman et al.
6,533,739 B1 3/2003 Palmer et al.
6,568,009 B2 5/2003 Linger et al.
7,056,295 B2 6/2006 Halperin
7,060,041 B1 6/2006 Weil et al.
7,226,427 B2 6/2007 Steen
7,308,304 B2 12/2007 Hampton et al.
7,569,021 B2 8/2009 Sebelius et al.
7,775,996 B2 8/2010 Strømsnes
7,841,996 B2 11/2010 Sebelius et al.
8,002,720 B2 8/2011 Hansen et al.
8,175,691 B2 5/2012 Huldt
8,690,804 B2 4/2014 Nilsson et al.

(56) References Cited

U.S. PATENT DOCUMENTS

| | | | |
|---|---|---|---|
| 8,888,725 B2 | 11/2014 | Parascandola et al. | |
| 8,920,348 B2 | 12/2014 | Freeman | |
| 9,655,809 B2 | 5/2017 | Freeman | |
| 9,775,771 B2 | 10/2017 | Stemple et al. | |
| 10,004,662 B2 | 6/2018 | Jeppsson et al. | |
| 2001/0011159 A1 | 8/2001 | Cantrell et al. | |
| 2001/0018562 A1 | 8/2001 | Sherman et al. | |
| 2001/0025151 A1 | 9/2001 | Kimball et al. | |
| 2001/0047140 A1 | 11/2001 | Freeman | |
| 2002/0007132 A1 | 1/2002 | Rothman et al. | |
| 2002/0026229 A1 | 2/2002 | Weil et al. | |
| 2002/0032383 A1 | 3/2002 | Weil et al. | |
| 2002/0055694 A1 | 5/2002 | Halperin et al. | |
| 2002/0117173 A1 | 8/2002 | Lynn et al. | |
| 2002/0128571 A1 | 9/2002 | Brenneman | |
| 2002/0133197 A1 | 9/2002 | Snyder et al. | |
| 2002/0177793 A1 | 11/2002 | Sherman et al. | |
| 2002/0193848 A1 | 12/2002 | Lyster et al. | |
| 2003/0055477 A1 | 3/2003 | Dupelle et al. | |
| 2003/0088276 A1 | 5/2003 | Covey et al. | |
| 2003/0149462 A1 | 8/2003 | White et al. | |
| 2003/0233129 A1 | 12/2003 | Matos | |
| 2004/0082888 A1 | 4/2004 | Palazzolo et al. | |
| 2004/0158303 A1 | 8/2004 | Lennox et al. | |
| 2004/0162510 A1 | 8/2004 | Jayne et al. | |
| 2005/0027238 A1 | 2/2005 | Fago et al. | |
| 2005/0038475 A1 | 2/2005 | Nova et al. | |
| 2006/0270956 A1 | 11/2006 | Wong et al. | |
| 2009/0260637 A1 | 10/2009 | Sebelius et al. | |
| 2010/0063425 A1 | 3/2010 | King et al. | |
| 2010/0185127 A1* | 7/2010 | Nilsson | A61H 31/00 601/41 |
| 2011/0308534 A1 | 12/2011 | Sebelius et al. | |
| 2012/0238922 A1 | 9/2012 | Stemple et al. | |
| 2013/0176158 A1* | 7/2013 | Kim | G01S 13/10 341/166 |
| 2013/0324894 A1* | 12/2013 | Herken | A61H 31/006 601/41 |
| 2014/0094724 A1 | 4/2014 | Freeman | |
| 2014/0171840 A1 | 6/2014 | Aelen et al. | |
| 2016/0296419 A1 | 10/2016 | Paulussen et al. | |
| 2017/0156979 A1 | 6/2017 | Walden et al. | |
| 2018/0042811 A1 | 2/2018 | Stemple et al. | |

FOREIGN PATENT DOCUMENTS

| | | | |
|---|---|---|---|
| EP | 1854444 | A1 | 11/2007 |
| EP | 1913923 | A1 | 4/2008 |
| EP | 2500008 | A2 | 11/2012 |
| FR | 1476518 | A | 4/1967 |
| FR | 2382889 | A1 | 10/1978 |
| FR | 2383889 | A1 | 6/1982 |
| GB | 1187274 | A | 4/1970 |
| SE | 521141 | C2 | 10/2003 |
| WO | 1996028128 | A1 | 9/1996 |
| WO | 1996028129 | A1 | 9/1996 |
| WO | 1999036028 | A1 | 7/1999 |
| WO | 2000027336 | A1 | 5/2000 |
| WO | 2000027464 | A3 | 8/2000 |
| WO | 2004066901 | A1 | 8/2004 |
| WO | 2012038855 | A1 | 3/2012 |

OTHER PUBLICATIONS

Cohen et al. "Active Compression-Decompression. A New Method of CardiopulmonaryResuscitation" Journal of the American Medical Association, vol. 267, No. 21, Jun. 1992, pp. 2916-2923.

International Search Report issued in International Application No. PCT/SE2004/01596 dated Mar. 1, 2005, 2 pages.

Steen et al "The Critical Importance of Minimal Delay Between Chest Compressions and Subsequent Defibrillation: a Haemodynamic Explanation" Resuscitation, vol. 58, Issue 3, Sep. 2003, pp. 249-258.

Tsuji et al. "Development of a Cardiopulmonary Resuscitation Vest Equipped with a Defibrillator" Proceedings of the 20th Annual International Conf. of the IEEE Engineering in Medicine and Biology Society, vol. 20, No. 1, 1998, pp. 426-427.

* cited by examiner

ADJUSTABLE PISTON

CROSS-REFERENCES TO RELATED APPLICATIONS

This application is a continuation in-part of U.S. patent application Ser. No. 16/138,677, filed Sep. 21, 2018, which is a continuation-in-part of U.S. patent application Ser. No. 15/982,729, filed May 17, 2018 and granted on Jun. 1, 2021 as U.S. Pat. No. 11,020,312, which is a continuation of U.S. patent application Ser. No. 14/573,995, filed Dec. 17, 2014 and granted on Jun. 26, 2018 as U.S. Pat. No. 10,004,662, which claims benefit under 35 U.S.C. § 119(e) of Provisional U.S. Patent Application No. 62/009,109, filed Jun. 6, 2014. This application also claims the benefit of U.S. Patent Application No. 63/184,687, filed May 5, 2021. The contents of all of those applications are incorporated in their entirety herein by this reference.

BACKGROUND

Cardiopulmonary resuscitation (CPR) is a medical procedure performed on patients to maintain some level of circulatory and respiratory functions when patients otherwise have limited or no circulatory and respiratory functions. CPR is generally not a procedure that restarts circulatory and respiratory functions, but can be effective to preserve enough circulatory and respiratory functions for a patient to survive until the patient's own circulatory and respiratory functions are restored. CPR typically includes frequent torso compressions that usually are performed by pushing on or around the patient's sternum while the patient is lying on the patient's back. For example, torso compressions can be performed as at a rate of about 100 compressions per minute and at a depth of about 5 cm per compression for an adult patient. The frequency and depth of compressions can vary based on a number of factors, such as valid CPR guidelines.

Mechanical CPR has several advantages over manual CPR. A person performing CPR, such as a medical first-responder, must exert considerable physical effort to maintain proper compression timing and depth. Over time, fatigue can set in and compressions can become less consistent and less effective. The person performing CPR must also divert mental attention to performing manual CPR properly and may not be able to focus on other tasks that could help the patient. For example, a person performing CPR at a rate of 100 compressions per minute would likely not be able to simultaneously prepare a defibrillator for use to attempt to restart the patient's heart. Mechanical compression devices can be used with CPR to perform compressions that would otherwise be done manually. Mechanical compression devices can provide advantages such as providing constant, proper compressions for sustained lengths of time without fatiguing, freeing medical personnel to perform other tasks besides CPR compressions, and being usable in smaller spaces than would be required by a person performing CPR compressions.

Mechanical CPR devices, and other medical devices, may provide advantages to performing medical tasks manually, for example, on patients having average dimensions. However, adjustability is needed in these devices to accommodate smaller and larger patients, to provide assistance in performing medical operations on these patients, without causing added risk.

SUMMARY OF THE DISCLOSURE

Illustrative embodiments of the present application include, without limitation, methods, structures, and systems. In one aspect, a mechanical CPR device may include a piston, for example, to drive chest compressions of a patient to perform CPR. The piston may have a suction cup attached to an end of the piston for contacting the sternum/torso of a patient. A drive component/controller may control the piston to extend the piston toward a patient's torso and retract the piston away from the patient's torso, to perform mechanical CPR. In order to accommodate patients having smaller dimensions, and particularly smaller chest or sternum heights, an extendable piston may be used to perform mechanical CPR. In one aspect, an extendable piston may include an inner piston having an outward surface, with at least one grove or recess disposed on the outward surface. An external piston sleeve, which may be part of or connected to a body of a mechanical CPR device, may be slidable over the inner piston. In some cases, the inner piston may be biased to at least partially slide into the external piston sleeve. A removable external piston spacer may be configured, when engaged to the at least one groove of the outward surface of the inner piston, to oppose the bias on the inner piston to prevent the inner piston from sliding into the external piston sleeve. The removable external piston spacer may, when attached to the inner piston, extend a length of the piston by a measurable distance, for example to enable the suction cup on an end of the piston to engage a smaller sternum of a patient. In some cases, the extendable piston, and/or mechanical CPR device, may include one or more sensors. The one or more sensors may detect the presence of the removable external piston spacer and/or determine the adjusted length of the piston itself, including the length of the inner piston and the external piston sleeve. This information may then be communicated to and used by a controller or motor of the mechanical CPR device to adjust motion of the piston to perform mechanical CPR.

In some cases, the sensor may be an inner piston sensor that detects the position of the inner piston relative to the external piston sleeve. In some implementations, the inner piston sensor may detect a displacement of the inner piston caused by the removable external piston spacer and communicate the displacement to a piston controller. The piston controller may subsequently modify movement or oscillation of the extendable piston to perform mechanical CPR.

In some examples, one or more spring members disposed about or around the inner piston may bias the inner piston to at least partially slide into the external piston sleeve. In some cases, a motor or drive component of the mechanical CPR device may bias the inner piston.

In some examples, the outward-facing surface of the inner piston may include two opposing grooves or recesses. The removable external piston spacer may correspondingly include two opposing flanges configured to engage the two opposing grooves of the inner piston. In some cases, the two opposing grooves may each define a substantially rectangular recess and each of the two opposing flanges may include a ridge having a substantially rectangular shape.

In another aspect, an extendable piston may include a center piston having at least one locking rod extending outwardly from the center piston. An external piston sleeve of the extendable piston may be rotatably connected to or disposed around the center piston. The extendable piston may additionally include an internal bayonet sleeve, having a length, that is rotatably disposed along an outside surface of the center piston between a compression spring and a decompression spring also positioned on the outside surface of the center piston. The internal bayonet sleeve may include a plurality of locking grooves, located at different angular positions and having different lengths along the internal bayonet sleeve, configured to engage the at least one locking rod. The at least one locking rod may be alignable with at least one of the locking grooves, for example, by rotating the center piston relative to the internal bayonet sleeve. Rotating the center piston relative to the internal bayonet sleeve may, as a result, adjust a length of center piston relative to the external piston sleeve, thus increasing or decreasing the length of the extendable piston. In some aspects, the extendable piston may include a sensor, such as a center piston sensor, that can detect a position or displacement of the center piston relative to the external piston sleeve. The sensor may communicate the displacement to a piston controller, which may modify an oscillation of the extendable piston based on the displacement. In some cases, detection of the position/displacement of the center piston may include detecting which of the grooves of the internal bayonet sleeve is engaged by the at least one locking rod. In some examples, the sensor may be part of or associated with a controller of a drive component (e.g., a motor or drive shaft) of a mechanical CPR device attached to the center piston and/or the external piston sleeve.

In another aspect, an extendable piston may be realized through a piston adapter. The piston adapter may include a suction cup or other patient engagement device and a body attached to the suction cup having a gas check valve. The piston adapter may further include a piston connection surface disposed on an end of the body, opposed to the suction cup, configured to temporarily adhere to a planar or other surface in response to activation of the gas check valve. In some examples, the piston connection surface may adhere to a piston, for example, of a mechanical CPR device. The gas check valve may, when activated, exert a suction pressure against a surface of the piston, between the surface of the piston and the piston connection surface of the piston adapter. In some cases, the mechanical CPR device may further include a drive component or motor, controlled by a controller. One or more sensors, either disposed on the piston adapter or on the piston or other part of the mechanical CPR device, may detect when the piston connection surface of the piston adapter contacts a surface of the piston. The sensor may indicate the connection of the piston adapter to the controller, such that the control may modify movement of the piston to accommodate the extra length of the piston added by the piston adapter.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Mechanical CPR compression devices having an adjustable length piston can provide many advantages over manual CPR compressions and/or non-adjustable mechanical CPR compression devices. As will be described in greater detail below, the use of an adjustable piston with a mechanical CPR device may provide additional benefits, including adaptability to accommodate patients of different sizes. It should be appreciated that the devices and techniques described herein may similarly be used in other applications. These other applications may include other mechanical devices, particularly medical devices, where patients of different sizes may require treatment.

Figure 1A:
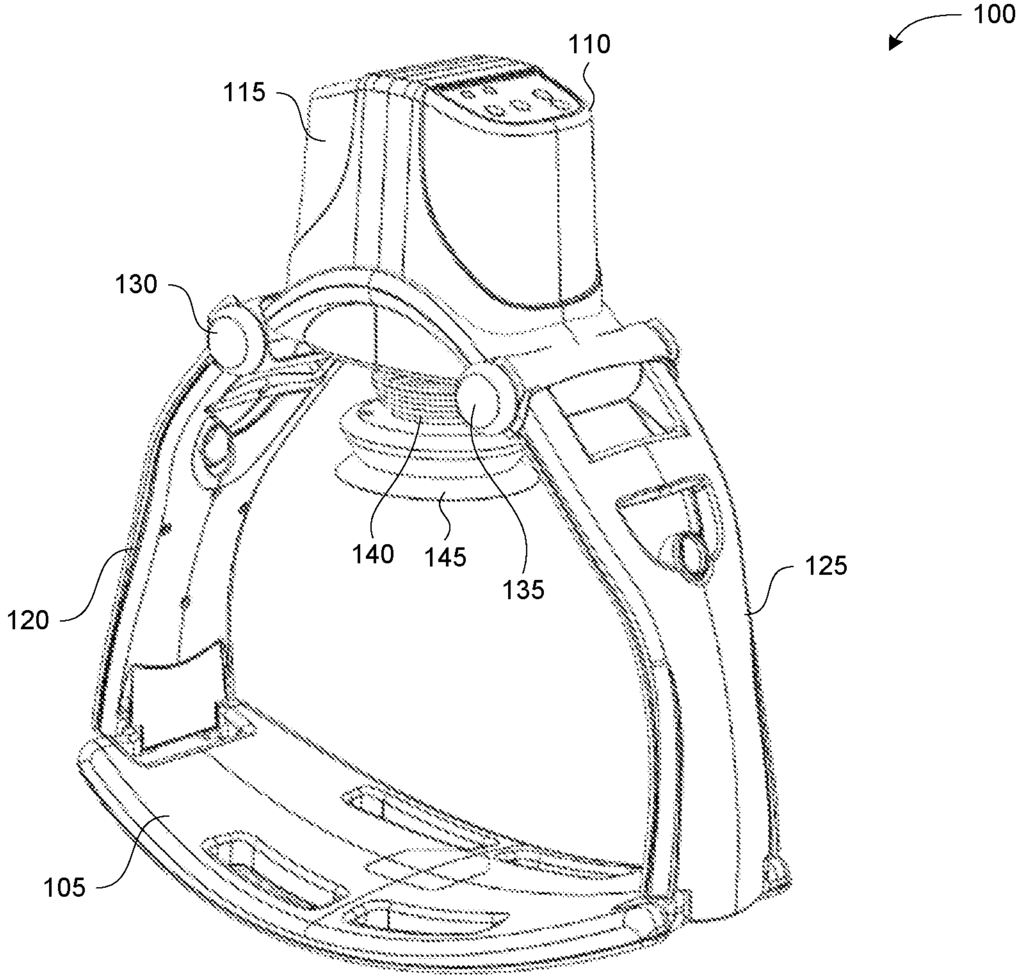
FIGS. 1A and 1B depict an isometric view and a side view, respectively, of one embodiment of a mechanical CPR device.
Figure 1B:
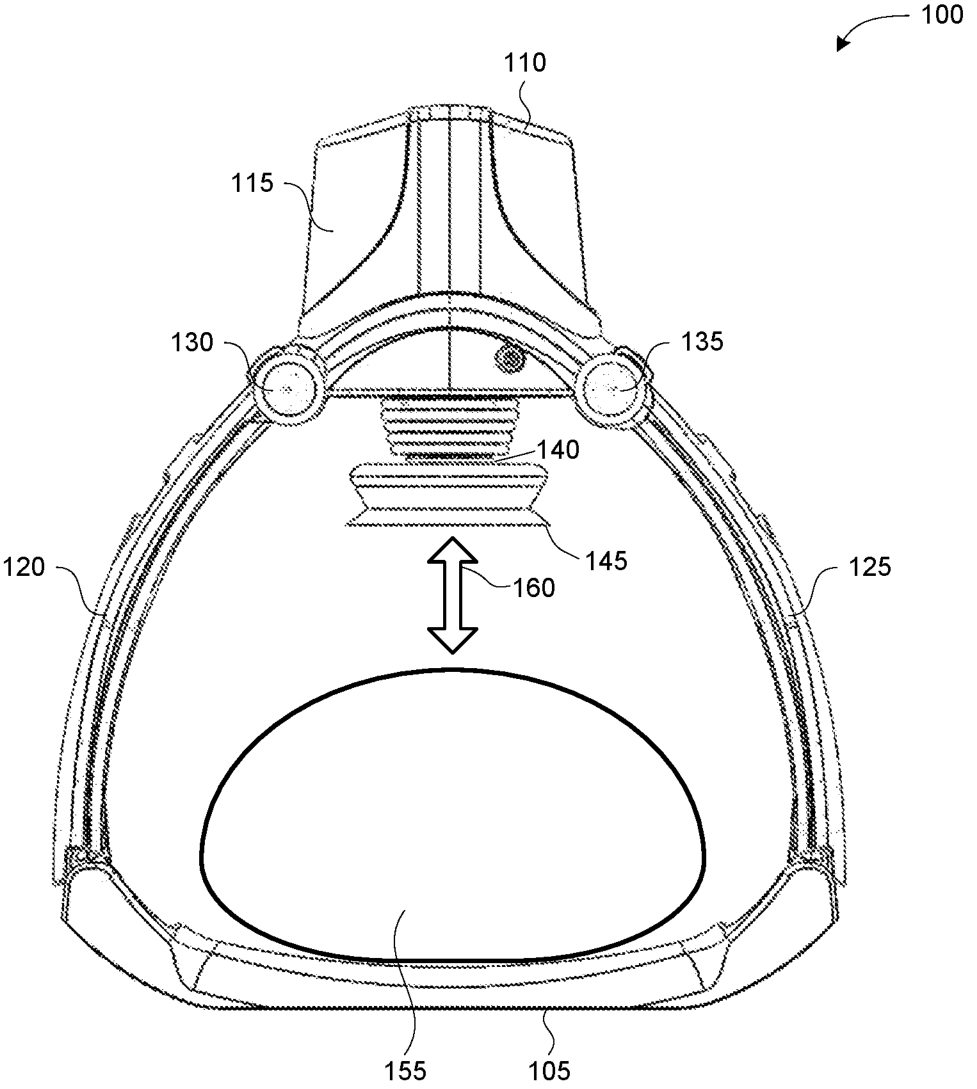

FIGS. 1A and 1B depict an isometric view and a side view, respectively, of one embodiment of a mechanical CPR device 100. The mechanical CPR device 100 includes a lower portion 105 and an upper portion 110. The upper portion 110 can have a main portion 115, also referred to as a central portion or unit, and two legs 120 and 125. Each of the legs 120 and 125 can be releasably connected to one of the sides of the lower portion 105. Items that are releasably connected are easily disconnected by a user, such as connections that can snap in and snap out, connection that do not require the use of tools to disconnect, quick-release connections (e.g., push button release, quarter-turn fastener release, lever release, etc.), and the like. Items are not releasably connected if they are connected by more permanent fasteners, such as rivets, screws, bolts, and the like. In the embodiment shown in FIGS. 1A and 1B, the legs 120 and 125 are rotatably attached to the main portion 115 about axes 130 and 135, respectively. However, in other embodiments, the legs 120 and 125 can also be fixed with respect to the main portion 115.

The main portion 115 can include a piston 140 with an end 145. The end 145 can be blunt, contoured, or otherwise configured to interact with a patient's torso. The end 145 can also have a suction cup that can temporarily attach to a patient's torso. The main portion 115 can include other components. For example, the main portion 115 can include a drive component, such as a motor or actuator, that can extend and retract the piston 140. The main portion 115 can include a power source, such as a rechargeable battery, that can provide power for the drive component. The main portion 115 can also include a controller that can control the movement of the piston 140 by controlling the drive component. In one embodiment, the controller can include a processor and memory, and the memory stores instructions that can be executed by the processor. The instructions can include instructions for controlling the piston 140 by controlling the drive component. The main portion 115 can also include one or more sensors that can provide inputs to the controller. The one or more sensors can include one or more of a force sensor to sense a force exerted by the piston 140, a spring sensor to sense a displacement of the piston 140, a current sensor to sense an amount of current drawn by the drive component, or any other type of sensor. The main portion 115 can also include one or more user input mechanisms, such as buttons, keys, displays, and the like. A user can input information to adjust the operation of the mechanical CPR device 100, such as a depth of compressions, a frequency of compressions, a maximum exertion force by the piston 140, and the like.

In addition to the mechanical CPR device 100, FIG. 1B also depicts a cross section of a patient's torso 155 with the patient's back against the lower portion 105 and the patient's chest facing the piston 140. While in the configuration depicted in FIG. 1B, the piston can be extended in the space 160 to the patient's torso 155, compress the patient's torso 155, and retract from the patient's torso. This process, wherein the piston 140 compresses the patient's torso 155 and is then retracted from the patient's torso, can be performed repeatedly to mechanically perform CPR.

Figure 2A:
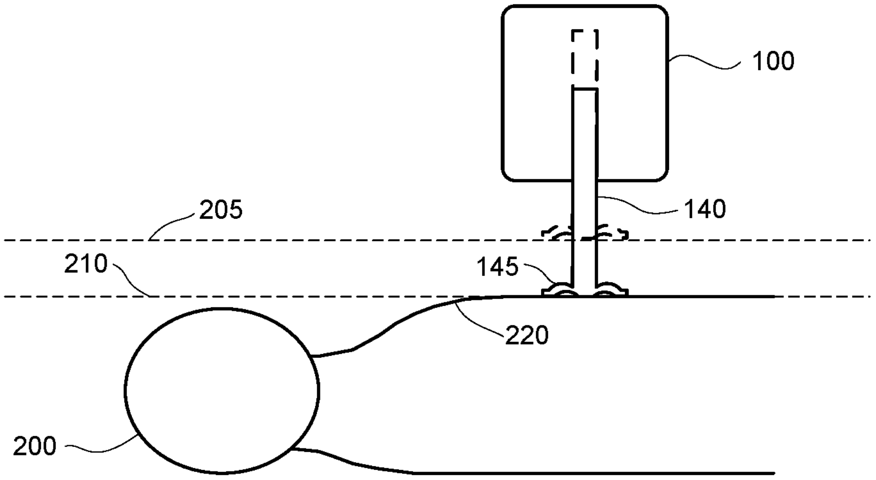
FIGS. 2A, and 2B, depict example operations of a mechanical CPR device on a patient, in accordance with the present disclosure.
Figure 2B:
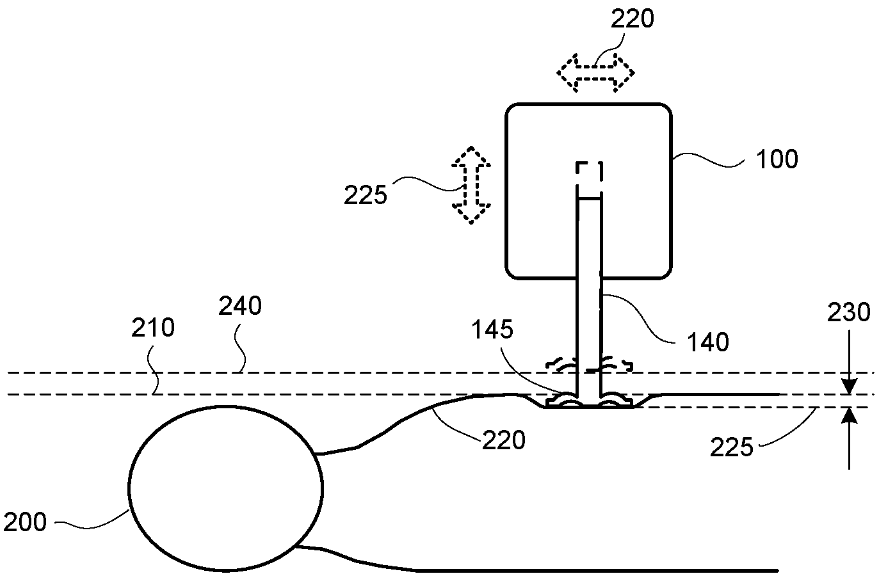

FIGS. 2A and 2B depict example operations of a mechanical CPR device 100 on a patient 200. FIGS. 2A and 2B depict a portion of a mechanical CPR device 100 that includes a piston 140. The end of the piston 140 includes a suction cup 145. The depictions in FIGS. 2A and 2B show cross sectional views of the mechanical CPR device 100, the piston 140, and the suction cup 145. The mechanical CPR device 100 could also include other components that are not depicted in FIGS. 2A and 2B, such as one or more components of mechanical CPR device 100 described above in reference to FIGS. 1A and 1B.

In FIG. 2A, the piston 140 is at first fully retracted into the mechanical CPR device 100, such that the suction cup 145 is at a position 205 above a torso 220 of patient 200. In this position, the suction cup 145 is not in contact with the patient's torso 220. From this first position 210, the piston 140 can be extended until the suction cup 145 of piston 140 is at a position or height 210. At height 210, the suction cup 145 is in contact with the patient's torso 220. The piston 140 can be extended by a drive component, such as a motor or an actuator, in the mechanical CPR device 100. A controller in the mechanical CPR device 100 may control the drive component.

From position 220, depicted in FIG. 2A, the piston 140/suction cup 145 can be further extended toward the patient's torso 220 until a threshold is reached so that air is forced out from the lower side of the suction cup 145, such as in position 225 depicted in FIG. 2B. In one example, the threshold can be a force threshold and the controller in the mechanical CPR device 100 can measure the force exerted by the piston 140 as the air is forced out from the lower side of the suction cup 145 and air is forced out of the patient 200. Once the force exerted on the patient's torso 220 by the piston 140 reaches the force threshold, the controller can stop the piston 140 from being extended any further, such as at position 225. In another example, the threshold can be a distance threshold and the controller in the mechanical CPR device 100 can measure the distance travelled 230 by the piston 140 as the air is forced out of the patient 200. Once the distance travelled 230 by the piston 140 reaches the distance threshold, the controller can stop the piston 140 from being extended any further. In yet another example, the threshold can be a pressure threshold and a pressure sensor can sense the pressure in the area between the suction cup 145 and the patient's torso 220. As the air is forced out from the patient 200, and the pressure reaches the pressure threshold, the controller in the mechanical CPR device 100 can stop the piston 140 from being extended any further. In any of these examples, the patient's torso 220 may be compressed as the piston 140 is extended, such as in the depiction in FIG. 2B. At the position 225 depicted in FIG. 2B, the suction cup 145 is attached to the patient's torso 220 and the patient's torso 220 is compressed by the piston 140.

From position 230, the piston 140 can be retracted to the position 210, as depicted in FIG. 2A, where the suction cup 145 originally came into contact with the patient's torso 220. From the position 210, the piston 140 can be further retracted until the position 235, where the piston 140 reaches a second threshold. The second threshold can be a force threshold, such as a force exerted when pulling up on the patient's torso 220. This second threshold can be measured by a spring activation sensor or other force sensor. For example, the piston 140 can be retracted until the spring activation sensor is activated and then the drive component can stop retracting the piston 140. From the position 235, the piston 140 can be extended toward the patient's torso 220, contacting the patient's torso at 210, compressing the patient's torso 220 by extending to position 225, and decompressing the patient's torso 220 by moving away from the patient's torso 220 to position 235. By repeating the movement of the piston 140 through positions 235, 210, 225, 210, to 235, mechanical CPR can be performed on patient 200.

In some cases, position 210, where the suction cup 145 engages the patient's torso 220, may be defined as a reference point or position. From this position 210, the compression and decompression stroke of the piston 140 can be determined. Defining and using reference position 210 as a position from which to measure the depth of CPR compressions and the height of CPR decompressions can help to avoid unintended injury to a patient. For example, a manual CPR device can be placed on a patient's torso and a user can manually push or pull on the manual CPR device to cause compressions or decompressions. However, the user of the manual CPR device does not have any reference position from which to measure the depth of compressions or the height of decompressions. Without a reference position, the user can cause additional injuries to the patient. For example, if the user pushes the manual CPR device down too far into the patient's chest during a compression, the compression might break one or more of the patient's ribs. When one or more of the patient's ribs are broken, it may be easier to compress the patient's chest and a subsequent compression by user of the manual CPR device can cause even more of the patient's ribs to be broken, and injury to the patient's internal organs. In contrast, establishing reference position 210 with respect to the patient's torso 220 can prevent CPR compressions from extending too deep. Moreover, even if one injury does occur (e.g., the breaking of a patient's rib), the reference position 230 will not change and the likelihood that a subsequent compression will cause even further injury can be reduced.

Using a reference position can also be beneficial is circumstances where the patient is not located in a stable or a flat position. For example, if a patient is being transported, such as on a stretcher or an ambulance, the patient may be jostled around or otherwise not in a stable position. However, if the mechanical CPR device is moving with the patient (e.g., if mechanical CPR is being performed in an ambulance while the patient is being transported), the reference position of the piston 140 or suction cup 145 can remain relatively fixed with respect to the patient and the mechanical CPR device can avoid over-compression and over-decompression. Thus, the benefits of avoiding unintended injury could still be realized if the patient is otherwise moving. In another example, the patient can be located in a position that is not flat, such as if the patient is being transported down stairs or the patient is on rough terrain. In these cases, if the mechanical CPR device is located with the patient in the same non-flat position, the reference position used by the mechanical CPR device would reflect the patient's non-flat position and the mechanical CPR device could avoid over-compression and over-decompression. A user performing manual CPR under such conditions may have difficulty in maintaining a desired compression depth and/or decompression height.

Figure 3A:
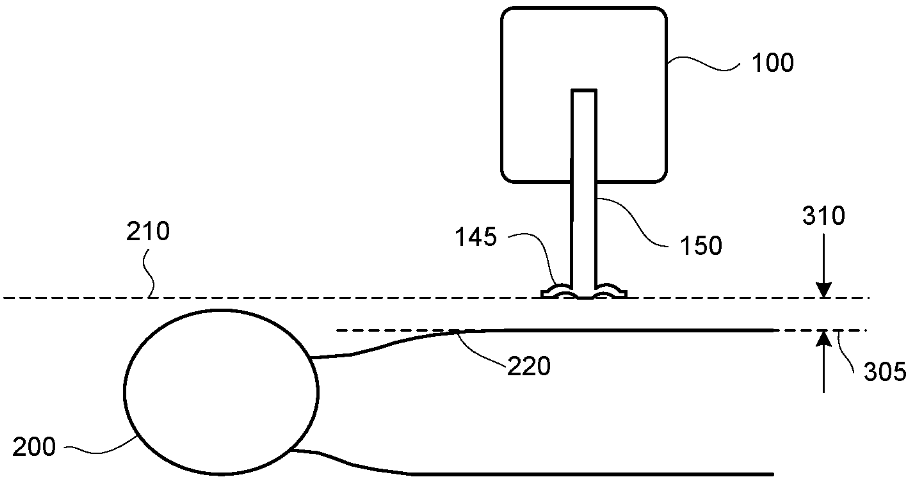
FIGS. 3A and 3B depict example operations of a mechanical CPR device with an adjustable piston on a patient having a small sternum, in accordance with the present disclosure.
Figure 3B:
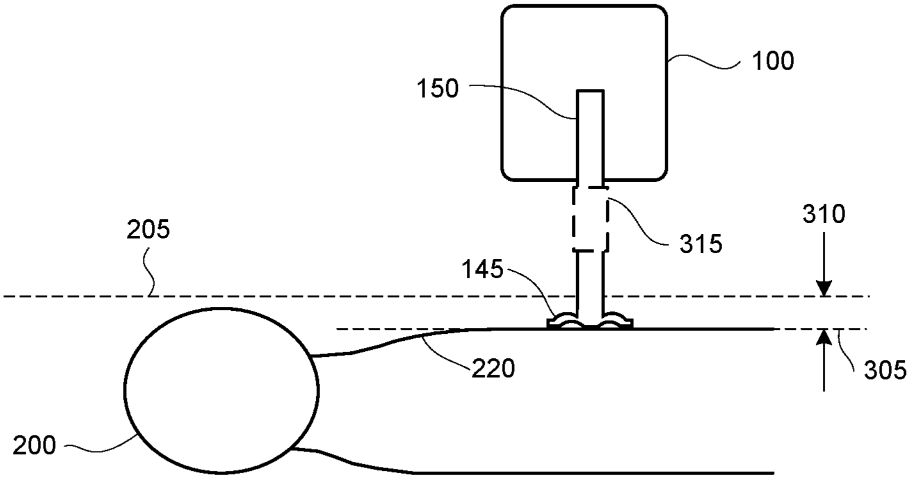

In some cases, the patient's torso may be of a smaller dimension, such that its maximum height is below position 210. This position is depicted in FIG. 3A as position 305. In this case, the piston 140 may not be of a sufficient length to extend to position 305 and extend further to compress the patient's torso 220. As depicted in FIG. 3B, the piston 140 may be modified by a device or mechanism 315 to extend the length of piston 140, so that the piston 140 may extend a distance 310 to engage a patient's torso 220 at position 305. In this way, by extending the piston 140 via device 315, the piston's reference point may be set correctly to accommodate a patient having a smaller sternum with a height 305. By adjusting the reference point of the piston 140/suction cup 145 to height 305, the movement of the piston may be recalibrated to correctly and safely perform mechanical CPR on patient 200.

Figure 4:
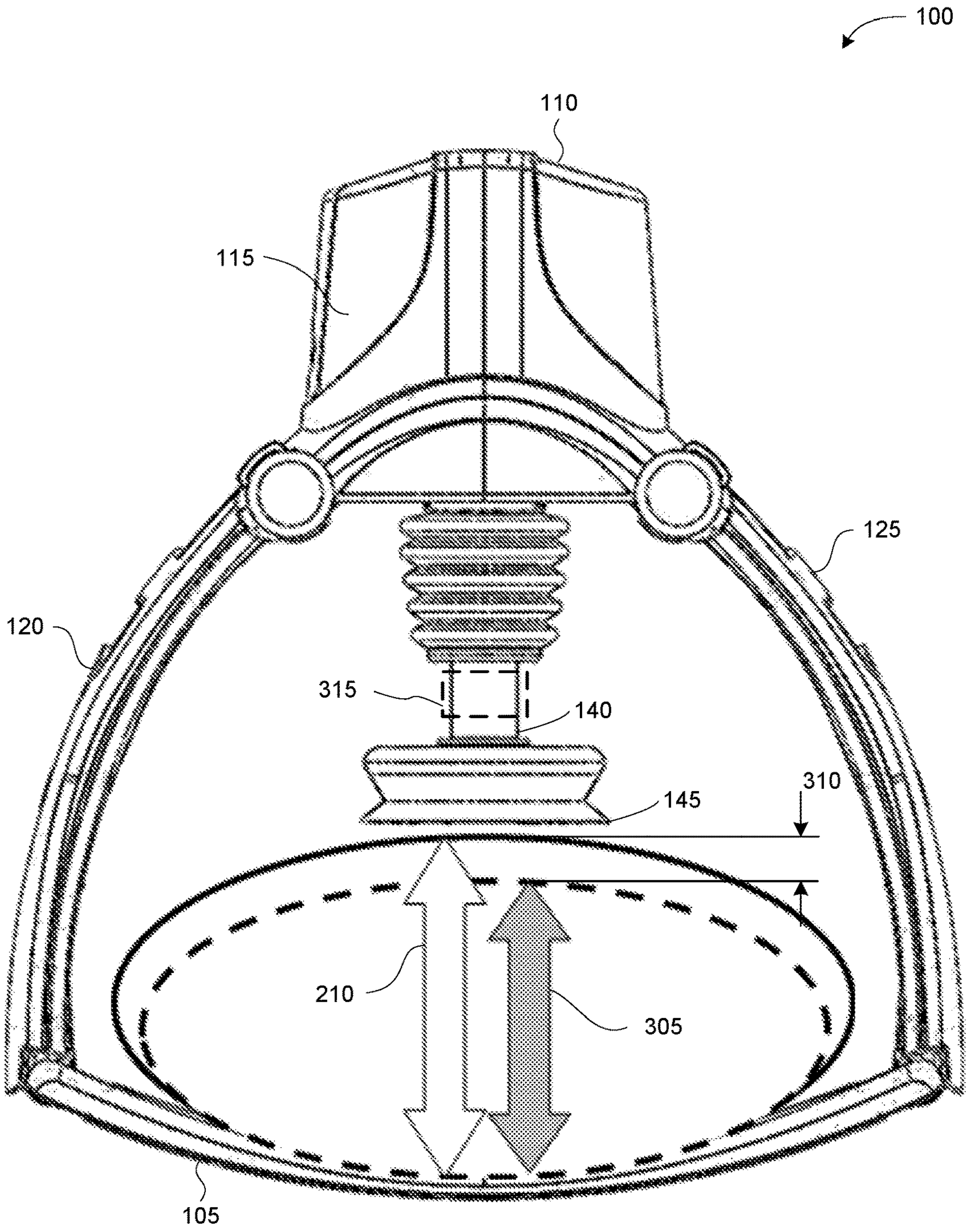
FIG. 4 depicts a side view of mechanical CPR device having an adjustable piston, in accordance with the present disclosure.

FIG. 4 depicts a side view of a mechanical CPR device 100 with an adjustable length piston 140. By modifying piston 140 to include a length adjustment device 315, the piston 140 may be extended to position 305 from position 210. In some aspects, a change in the reference point or nominal height of the piston 140 from position 210 to position 305, represented by displacement 310, may be detected by one or more sensors. The change in height or displacement 310 of the reference point may then be communicated to a controller and/or drive component of the mechanical CPR device 100. The controller/drive component may adjust the movement of the piston based on the detected change 415 in position or displacement of the piston 140, for example, to calibrate the fully extended position and the retracted position of the piston 140 to safely perform mechanical CPR on a patent having a smaller torso/sternum.

FIGS. 5A, 5B, 5C, 5D, 5E, 5F, and 5G depict multiple views, both side and cut-out views, of an example 500 of an external piston spacer 555 that may be used to extend the length of piston of a mechanical CPR device, such as piston 140 of mechanical CPR device 100. In reference to FIG. 5A, a piston of a mechanical CPR device, for example piston 140, may include an external piston sleeve 505 and an inner piston 510 having an outward surface 512. A portion of the length of the inner piston 510 may be slidably located within the external piston sleeve 505. The amount or length by which the inner piston 510 is positioned within the external piston sleeve 505 may adjust a full piston length 522. An end of the piston 515, which in some cases may include a suction cup 145, may be positioned a distance 520 away from the end of the external piston sleeve 505. In some cases, the inner piston 510 may be biased to be located at least partially within the external piston sleeve 505. In some cases, a spring 545 or a member having elastic or semi-elastic properties may be located along a length 522 of the inner piston 510, for example inward from the outward facing surface 512. The spring may at least partially bias the inner piston 510 to slide partially into the external piston sleeve 505. In some cases, a drive component of the attached mechanical CPR device (not shown), such as mechanical CPR device 100, may bias or determine a resting position of the inner piston 510.

In some cases, the external piston spacer 555, the inner piston 510, and/or the external piston sleeve 505 may be defined by a circular or oval cross-section. In other cases, the external piston spacer 555, the inner piston 510, and/or the external piston sleeve 505 may be defined by other cross-sections, such as, rectangular, polygon, and so forth, such that the external piston spacer 555, the inner piston 510, and the external piston sleeve 505 have the same shaped-cross section (but not necessarily the same dimensions). In other examples, the external piston spacer 555, the inner piston 510, and/or the external piston sleeve 505 may have different-shaped cross-sections, that are engage-able or slidable about each other.

Figure 5A:
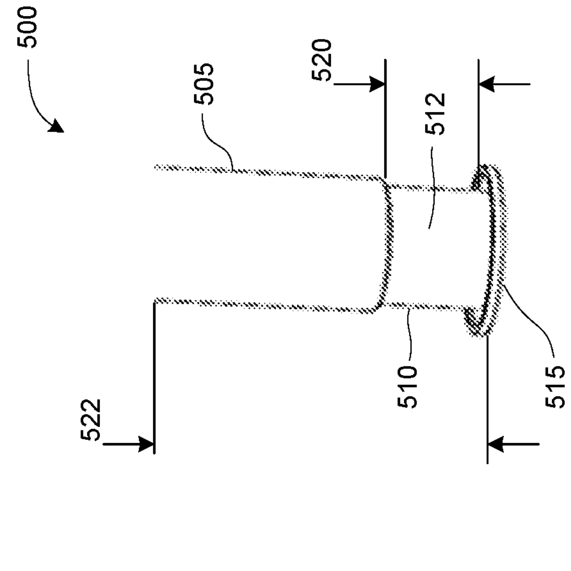
FIGS. 5A, 5B, 5C, 5D, 5E, 5F, and 5G depict an example of an adjustable piston including a removable external piston spacer, according to an aspect of the present disclosure.
Figure 5B:
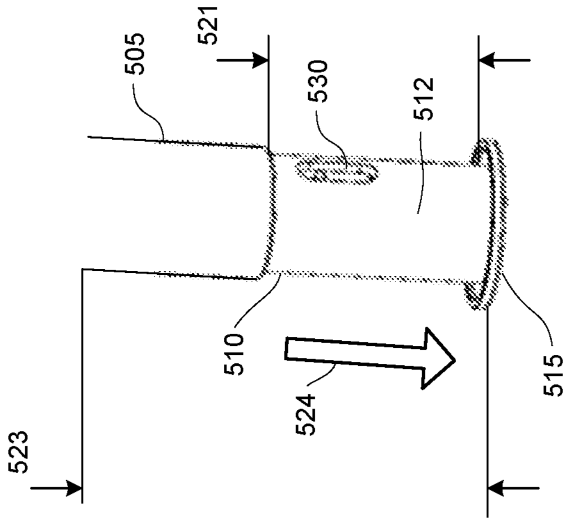

As depicted in FIG. 5B, the inner piston 510 may be extended 524 away from the external piston sleeve 505. In some cases, the length from the piston end and the end of the external piston sleeve 505 may be extended to a length 521, thus increasing the full piston length an equal amount to length 523. In this scenario, the outward surface 512 of the extended portion of the inner piston 510 (not within the external piston sleeve 505), may include one or more grooves or recesses 530. As depicted in FIG. 5B, one groove 530 may be disposed on the outward surface 512 of the inner piston 510. However, in other scenarios, the outward surface 512 of the inner piston 510 may have two opposed grooves 530, or any other number of grooves or recesses in any angular arrangement/at any position along the outward surface 512 of inner piston 510.

Figure 5C:
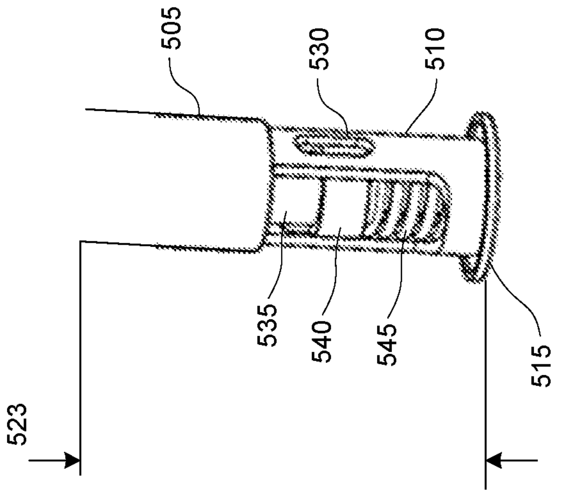

FIG. 5C depicts a cutout-view of piston having extended length 523. The inner piston 510 may include a center piston or center piston portion 535, for example, that may be connected to a drive component or motor of a mechanical CPR device, such as device 100. A slidable ring or inner sleeve 540 may be disposed about the center piston portion 535 at an end of the center piston portion 535 located distal to the external piston sleeve 505. The inner sleeve 540 may contact a spring 545, also positioned axially relative to the inner piston 510 and the inner piston portion 535, between the sleeve 540/center piston portion 535 and the piston end 515. In some cases, the spring 545 may bias the inner piston 510 and/or the center piston portion 535 to move towards the external piston sleeve 505. In yet some examples, the spring 545, additionally or alternatively, may aid in determining and setting the correct compression and decompressions stroke of piston 140, for example via sensing force exerted on the piston end 515. In some examples, a drive component of the mechanical CRP device, and/or one or more other springs may bias the center piston portion 535/ring 540 to contact spring 545. In some examples, the one or more grooves 530 may extend through a thickness of the outward surface 512, such that a portion of the center piston portion 535 and/or the piston ring 540 are exposed.

Figure 5D:
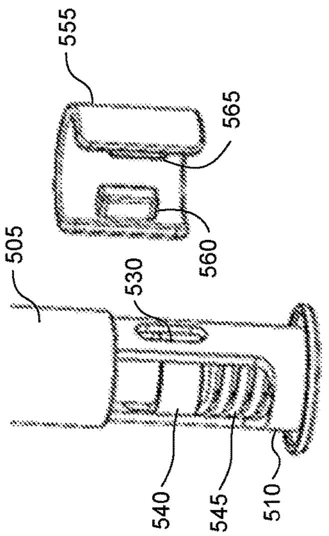

A removable external piston spacer 555, as depicted in FIG. 5D, having a circular cross-section, may include two flanges or ridges 560, 565. The two flanges 560, 565, may be located on an inward facing surface of the external piston spacer 555. In some cases, the external piston spacer 555 may be ring-shaped in cross-section, having a thickness. In this scenario, the external piston spacer 555 may engage at least a portion of the inner piston 510, for example, when the flanges 560,565 are aligned with grooves 530. In some examples, the flanges 560, 565 may have a substantially rectangular shape to engage and fit within grooves 530. In other cases, the flanges 560, 565 and the grooves 530 may have other corresponding shapes, such as circular, triangular, polygon shape, etc. In some cases, the flanges 560, 565 may extend inward from the external piston spacer 555 a distance. The distance may be equal to or greater than a thickness of the outward surface 512 of the inner piston 510, so as to ensure stable engagement with the inner piston 510.

Figure 5E:
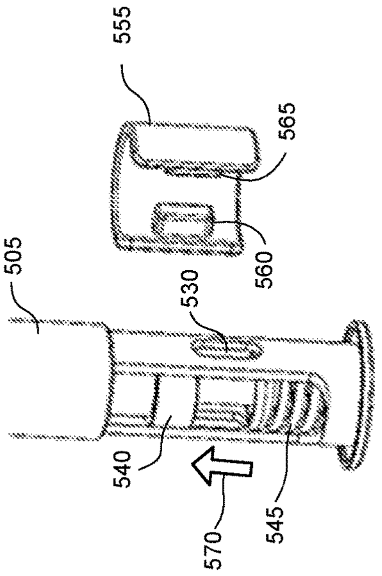
Figure 5F:
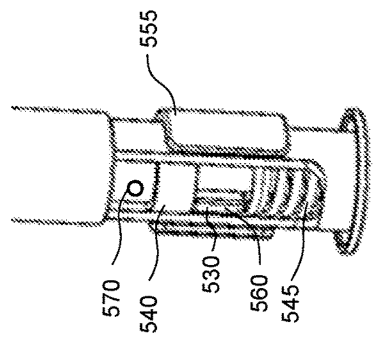
Figure 5G:
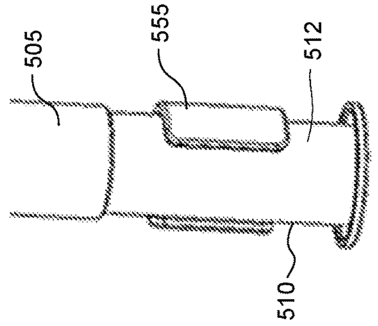

As depicted in FIG. 5E, the external piston spacer 555 may be placed on the outward surface 512 of the inner piston 510, by aligning the flanges 560, 565 with the grooves 530. In some cases, inserting the flanges 560, 565 into the grooves 530 may push or force 570 the center piston portion 535 and/or the ring 540 upward toward the external piston sleeve 505. In some examples, the flanges 560, 565 may extend inward from the external piston spacer 555 a distance greater than a thickness of the outer surface 512 of the inner piston 510, such that the flanges 560, 565 may separate the center piston portion 535 and/or the ring 540 from contacting the spring 545, as depicted in FIG. 5F. One or more sensors 570, such as a wiper, potentiometer, or other sensor electrical, mechanical, or optical sensor may detect the change in length 523 of the piston 140 caused by the presence of the external piston spacer 555. The sensor(s) 570 may communicate the detected change in position or displacement to a controller or drive component of the mechanical CPR device 100. The controller or drive component may then modify the compression and decompression stroke, e.g., the oscillation of the piston 140 to accommodate the changed length. Modifying the movement of the piston 140 may ensure or help to ensure more safe operation of the mechanical CPR device 100 when a patient having a smaller sternum/torso is treated using the mechanical CPR device 100.

In some examples, the one or more sensors 570 may be part of the drive component or motor of the mechanical CPR device 100. In this scenario, the sensor(s) 570 may be wipers that detect the angular position of the motor or drive component, for example of a drive shaft of a motor. The drive component may be configured, for example via instructions such as computer code and the like, to adjust at least one of a stroke compression and stroke decompression based on the detected change in resting angular position of the drive shaft.

In the example illustrated, the flanges 560 and 565 may be spaced at 180 degrees apart from one another, each positioned at an external edge of the external piston spacer 555. In this example, the external piston spacer 555 may also wrap approximately 180 degrees or less around the inner piston 510.

In some examples, the external piston spacer may have a length that is less than the length of the inner piston 510, so as to be engage-able about the outward face 512. In the example illustrated, the flanges 560, 565 may prevent the inner piston 510 from sliding, at least partially, into the external piston sleeve 505, for example by opposing a bias created by spring 545, a drive component, or any number of spring or elastic members. In other examples, a body of the external piston spacer 555 may prevent the inner piston 510 from sliding, at least partially, into the external piston sleeve 505.

FIGS. 6A, 6B, 6C, 6D, and 6E depict multiple views, both side and cut-out views, of an example 600 of an internal bayonet sleeve 620 that may be used to extend the length of a piston of a mechanical CPR device, such as piston 140 of mechanical CPR device 100. In the example descried below, the piston, such as piston 140, may include an external piston sleeve 505, and an inner piston 510 having a piston end 515, as described above in reference to FIG. 5.

The inner piston 510 may include a center piston 615, which may include one or more aspects of center piston portion 535 described above. The center piston 615 may be axially positioned relative to the external piston sleeve 505. The center piston 615 may contact a compression spring 605 at one end proximate to the piston end 515 and may contact a decompression spring 610 at an opposing end proximate to the external piston sleeve 505. The compression spring 605 and/or the decompression spring 610 may bias the center piston 615 to at least partially slide into the external piston sleeve 505. In some cases, the compression spring 605 may detect a force applied between the piston end 515, for example against a patient, and the center piston 615. The compression of the spring 605 may inform a controller or drive mechanism of the mechanical CPR device 100 when a fully compressed position has been reached. Similarly, the decompression spring 610 may detect a force applied between the center piston 615 and the external piston sleeve 505. The decompression of the spring 610 may inform a controller or drive mechanism of the mechanical CPR device 100 when a fully decompressed position has been reached. The center piston 615 and/or the inner piston 510 may be rotatably connected to a mechanical CPR device (not shown), such as device 100, by a retaining ring 640. In some cases, the center piston 615 may be connected to and driven by a drive shaft or other drive component of the mechanical CPR device 100. The drive component may drive the center piston 615 to extend away from and retract toward the CPR device 100 and the external piston sleeve 505.

An internal bayonet sleeve 620 may slidably surround or engage a portion of an outside surface 616 of the center piston 615. The internal bayonet sleeve 620 may form a ring or partial ring around the center piston 615. The bayonet sleeve 620 may have a length 621 and may have a plurality of grooves 625, 630 on one end. The plurality of grooves 625, 630 may be located at different angular positions around the bayonet sleeve 620 and may have varying lengths relative to length 621 of the bayonet sleeve 620. For example, groove 625 may only define a space having a short length, while groove 630 may define a space having a length equal to length 621 of the bayonet sleeve 620. Any number of grooves 625, 630 having varying lengths may similarly define spaces on bayonet sleeve 620.

One or more locking rods 635 may be positioned on the outside surface 616 of the center piston 615. The locking rod(s) 635 may have any number of shapes, such as circular, rectangular, polygon, etc., and may extend beyond the outside surface 616 a distance. The distance may be short enough to allow the center piston 615 and the locking rods 635 to rotate 645 relative to the outward surface 512 and/or the internal bayonet sleeve 620. In some cases, the one or more locking rods 635 may be connected to the outward surface 512, such that rotating the inner piston 510 may rotate the center piston 615.

The one or more locking rods 635 may have a width that is similar to or slightly smaller than a width of grooves 625, 630 of the internal bayonet sleeve 620, such that the locking rod(s) 635 may engage one or more grooves 625, 630. When one or more locking rods 635 engage one or more grooves 625, 630, the center piston 615 may be locked or rotationally fixed relative to the internal bayonet sleeve 620 and/or the outward surface or plate 512.

Figure 6A:
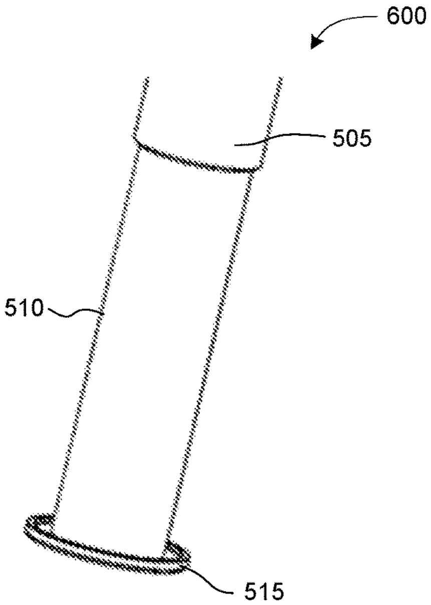
FIGS. 6A, 6B, 6C, 6D, and 6E, depict an example of an adjustable piston including an internal bayonet sleeve, according to an aspect of the present disclosure.
Figure 6B:
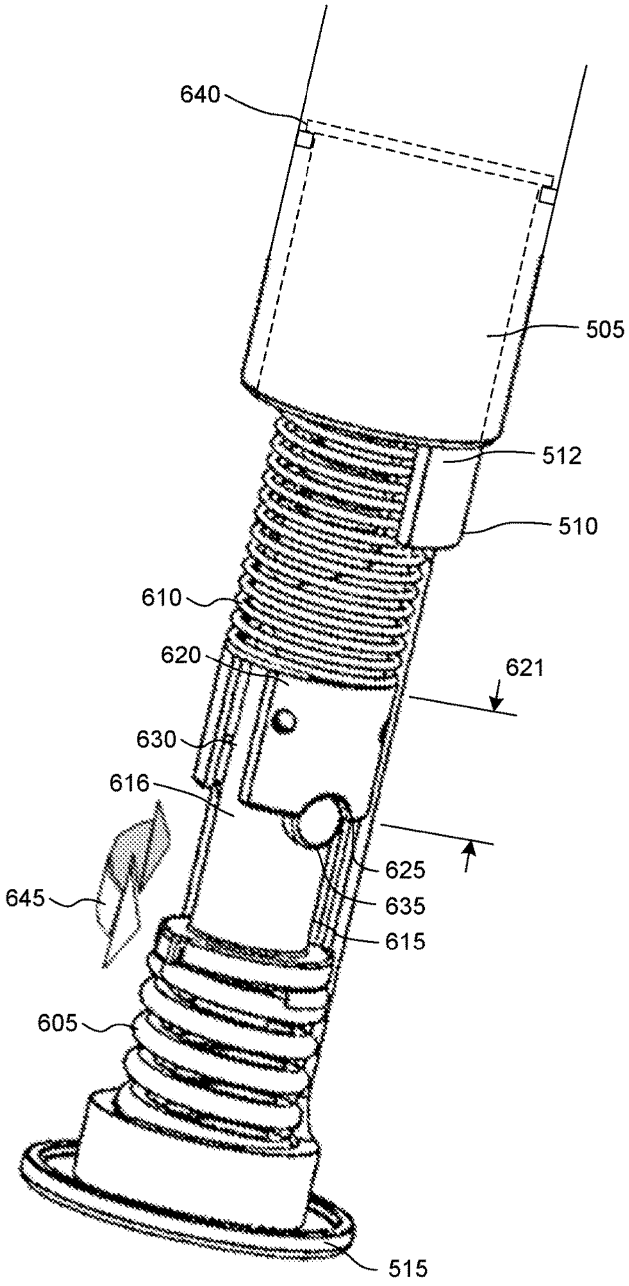
Figure 6C:
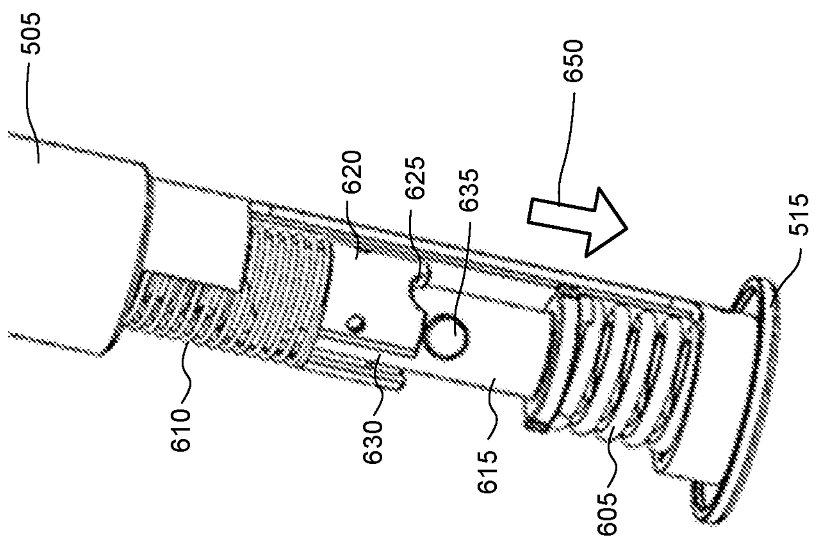
Figure 6D:
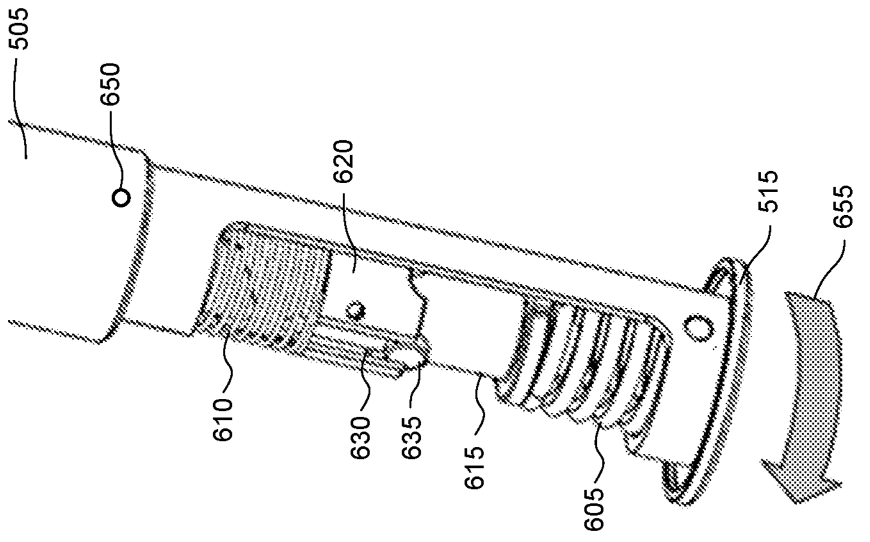
Figure 6E:
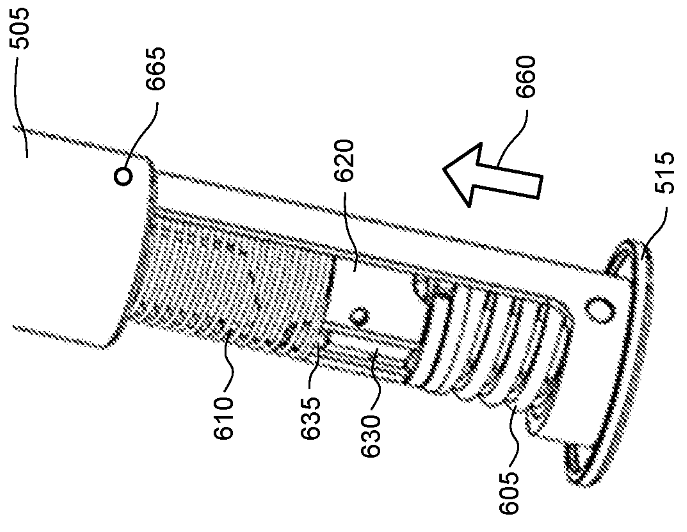

As depicted in FIG. 6C, the inner piston 510 and/or center piston 615 may be extended 650 away from the external piston sleeve 505, for example, by applying a force to piston end 515 and/or inner piston 510. Extending the center piston 615 relative to the internal bayonet sleeve 620, which may be fixed to the external piston sleeve 505, may disengage the one or more locking rods 635 from one or more of the grooves 625, 630. In one example, two locking rods 635 may be positioned on the center piston 615, 180 degrees apart from each other. Similarly, two grooves 625, having the same length, may also be positioned on the internal bayonet sleeve 180 degrees apart. By extending the center piston 615 away from the internal bayonet sleeve 620 and disengaging the locking rods 635 from grooves 625, the center piston 615 may be made rotatable about the internal bayonet sleeve 620. As depicted in FIG. 6D, the center piston 615 may be rotated 90 degrees clockwise 655 relative to the bayonet sleeve 620. The locking rods 635 may be aligned with grooves 630 (in this example, also spaced 180 degrees apart and having a same length). As depicted in FIG. 6E, once aligned, the center piston 615 may be moved or pushed 660 toward the external piston sleeve 505 until the locking rods 635 engage or stop against an end of grooves 630 or at the decompression spring 610, or until the internal bayonet sleeve 620 contacts the spring 605. In some cases, one or more of springs 605, 610 may bias the center piston 615 to naturally rest at a position closest to the external piston sleeve 505.

In some cases, one or more sensors 665 may be positioned on the outer piston 505 to detect a change in the length of the inner piston 510/the entire piston 140 (including the inner piston 510 and the external piston sleeve 505), caused by positioning the locking rods 635 in different grooves 625, 630. In some cases, the one or more sensors 665 may include an n electrical sensor, such as a wiper or potentiometer, a mechanical sensor, and/or an optical sensors. In some cases, the one or more sensors 665 may detect a position of the inner piston 510 relative to the external piston sleeve 505, may detect the angular position of a drive component of the mechanical CPR device 100, and/or may detect contact between the locking rods 635 and one or more grooves 625, 630. In some examples, each contact position between a groove 625, 630 and a locking rod 635 may be associated with a predetermined or pre-measured distance or displacement. Upon detection by sensor(s) 665, the corresponding displacement value may be accessed and used to calibrate a controller or drive component of the mechanical CPR device.

Figure 7:
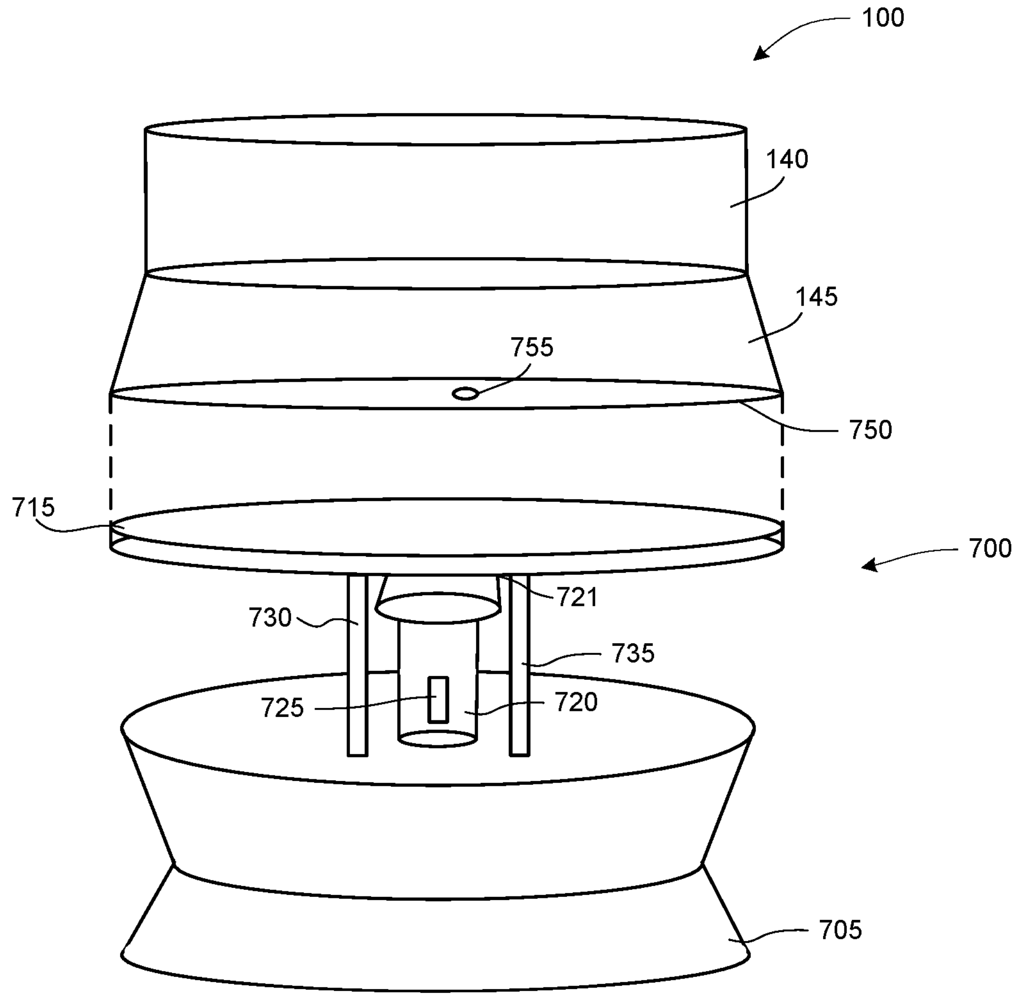
FIG. 7 depicts an example of an adjustable piston including a piston adapter, according to an aspect of the present disclosure.

FIG. 7 depicts an example of an adjustable piston including a piston adapter 700. The piston adapter 700 may be removably attachable to a surface 750 of piston, such as piston 140 attached to a mechanical CPR device 100. In some cases the piston adapter 700 may be attachable to the bottom surface of suction cup 145. The piston adapter 700 may include a piston connection surface 715 connected to one end 721 of a body 720, which may be circular in cross section. At an opposite end of the body 720, a suction cup 705 may be attached and configured, for example, to contact the torso/sternum of a patient. In some cases, suction cup 705 may be similar to and/or include one or more aspects of suction cup 145. In some aspects, the piston connection surface 715 or plate may be connected to the suction cup 705 via one or more members 730, 735, which may add rigidity to the piston adapter 700.

To attach the piston adapter 700 to the piston 140, the piston adapter 700 may be positioned beneath the piston surface 750 and the piston connection surface 715 may be moved to contact the piston surface 715. Upon contact, a gas check valve 725 may be engaged to temporarily or removably adhere the piston connection surface 715 to the piston surface 750. In some examples, the piston surface 750 or other part of piston 140 may include one or more sensors 755. The one or more sensors 755 may detect when the surfaces 750 and 715 come into contact. The one or more sensors 755 may include any of pressure sensors, optical sensors, force sensors, etc. In some aspects, upon detecting contact between surfaces 750 and 715, the piston 140 or a controller thereof may send an indication (e.g., via a wireless connection by a transceiver, a wired connection, etc.) to the piston adapter 700. Upon receiving the indication, the gas check valve 725 may be made operational. A controller of the piston 140 may detect when the piston adapter 700 is attached to the piston 140, and may prevent attachment of the piston adapter 700 to the piston 140 until the piston controller has detected and acknowledged, for example, the change in length of piston 140 due to the attachment of the piston adapter 700. In this way, injury to a patient may be reduced or eliminated that may be caused by the piston 140 being extended toward a patient without proper calibration (e.g., accounting for the length added by the piston adapter 700).

In some cases, a length of the piston adapter may be detected by the piston/sensor 755 or communicated to the piston controller by the piston adapter 700. The piston controller may then adjust a stroke of the piston 140 to account for the changed length of the piston 140.

Figure 8:
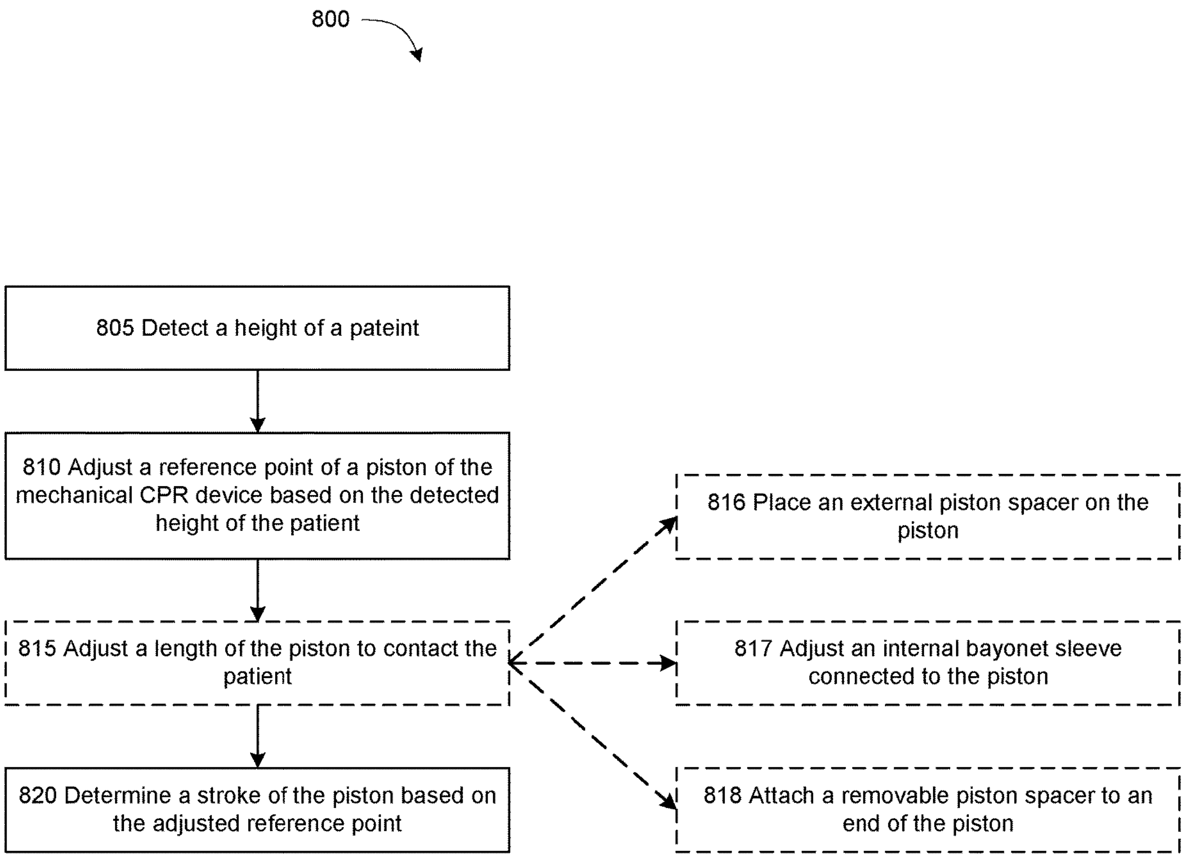
FIG. 8 depicts an example method of adjusting the length of a piston of a mechanical CPR device, in accordance with the present disclosure.

FIG. 8 depicts an example of a method 800 of configuring a mechanical CPR device, such as device 100, to accommodate a patient, for example having a smaller torso/sternum. At block 805, a height of a patient to be treated may be detected. This may include using one or more sensors. In some cases, a piston, such as piston 140, may be extended toward a patient until contact with the patient is detected, for example, by analyzing the force exerted on one or more springs of the piston 140, such as spring 545 and/or 605. In other cases, one or more optical sensors may be used to detect the height of a patient. In yet some aspects, the height may be received by the mechanical CPR device 100, for example from one or more inputs via an operator.

At block 810, a reference point of the piston 140 may be adjusted based on the detected height of the patient. In some cases, the reference point may be adjusted and/or set according to the techniques described in reference to FIGS. 3A and 3B, for example to height 305 from height 210, which may be a nominal height of the mechanical CPR device 100/piston 140.

In some cases, method 800 may include operations performed at block 815, including adjusting a length of the piston to contact the patient, for example according to the adjusted reference point. The operations at block 815 may be performed by placing an external piston spacer 500 on the piston, as described in reference to FIGS. 5A through 5G, at block 816. The operation at block 815 may additionally or alternatively include adjusting an internal bayonet sleeve 600/one or more locking rods engage-able about the bayonet sleeve, as described above in reference to FIGS. 6A though 6E, at block 817. The operation at block 815 may additionally or alternatively include attaching a removable piston adapter 700 to the end of the piston, as described above in reference to FIG. 7.

At block 820, the stroke of the piston may be determined based on the adjusted reference position. Mechanical CPR may then be performed on a patient using the configured mechanical CPR device according to the determined stroke of the piston. In this way, compression and decompression of the piston may be calibrated to account for the added piston length. This may increase the number of patients that may be treated by a mechanical CPR device 100. Additionally or alternatively, the use of an adjustable piston may help reduce risk associated with mechanical CPR, including injury to a patient due to the compression stroke of the piston not being adjusted to a patient having a smaller torso.

Figure 9A:
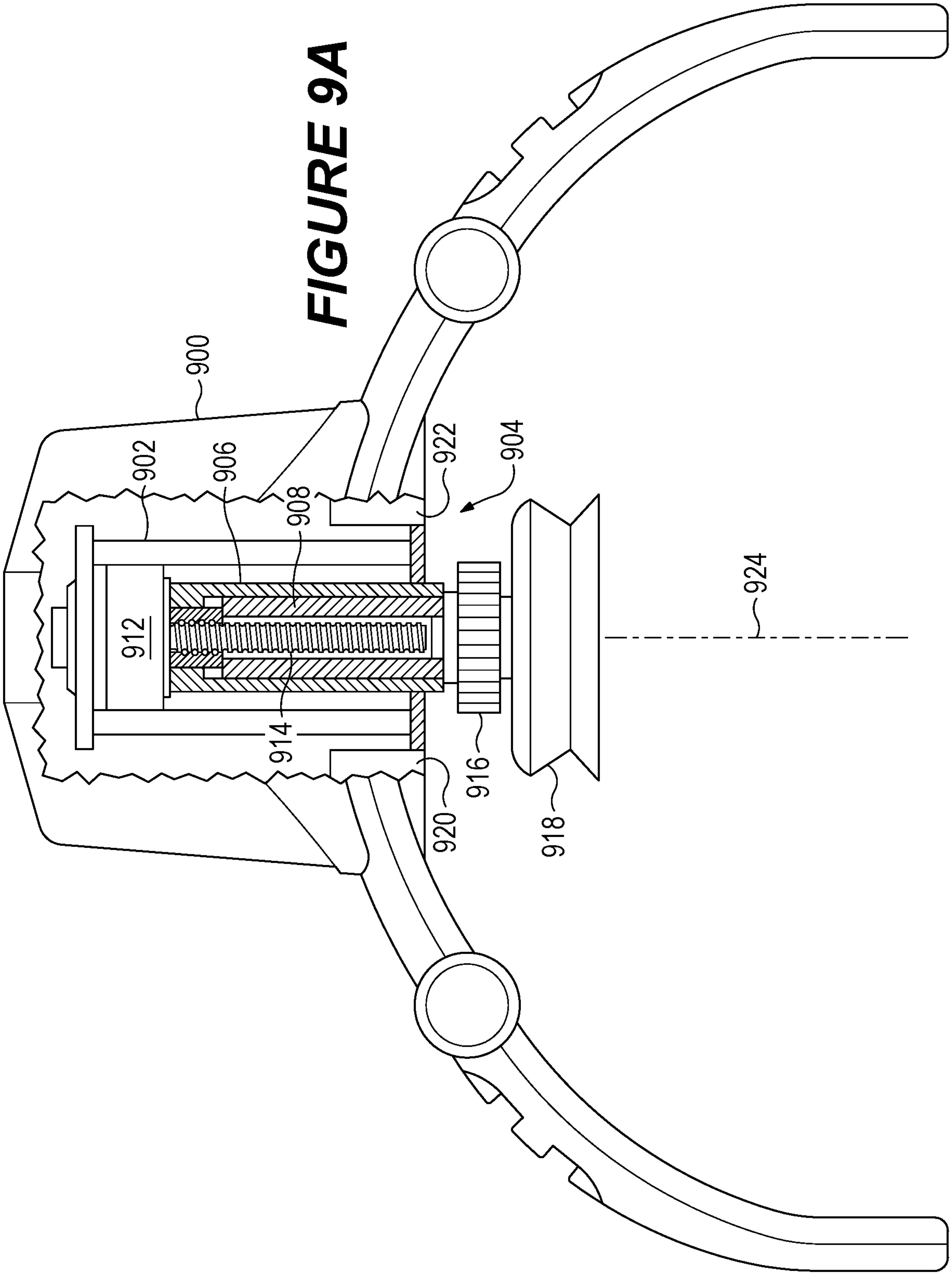
FIGS. 9A and 9B depict a cut-away view of an adjustable piston according to some examples of the present disclosure.
Figure 9B:
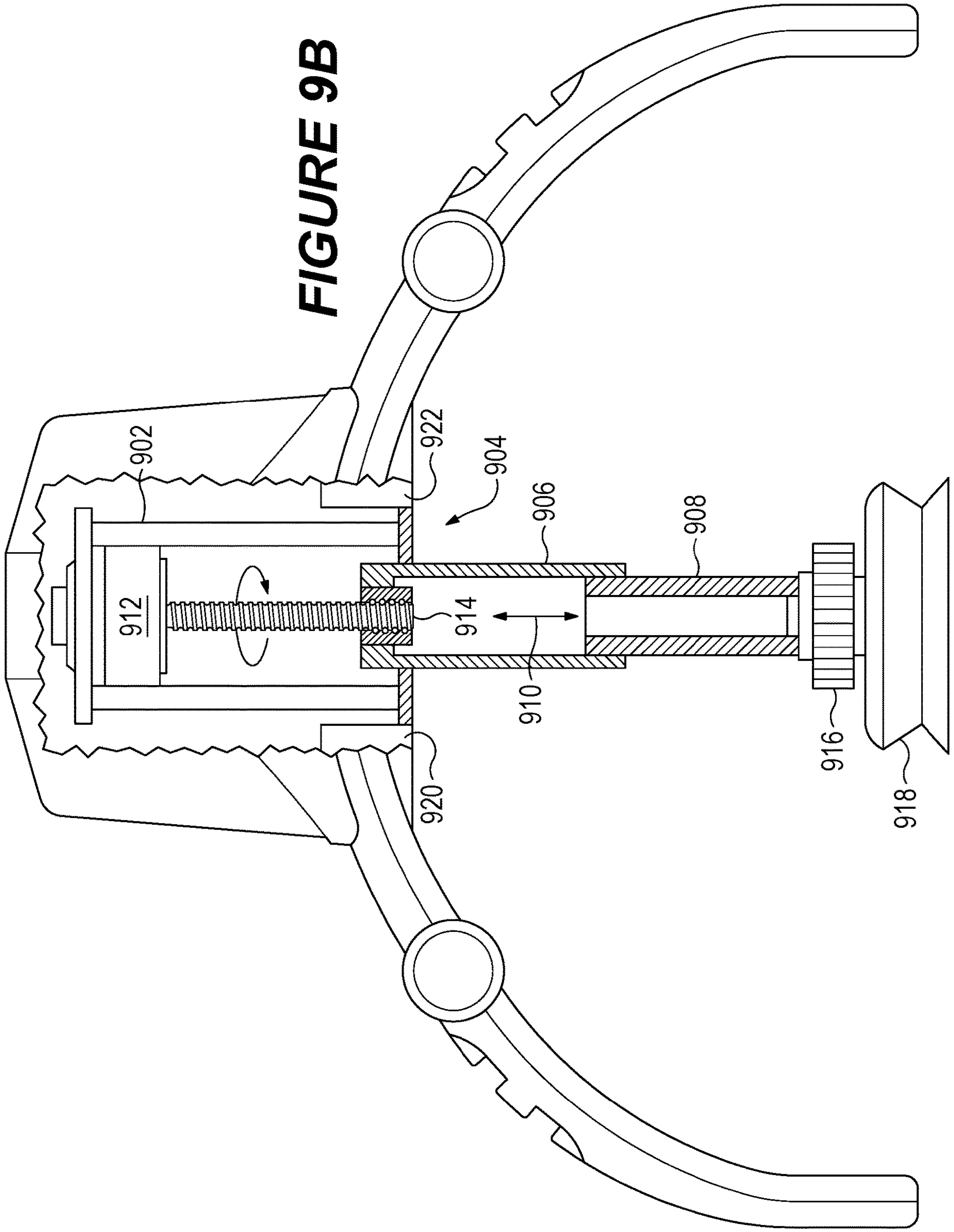

FIGS. 9A and 9B show a cross-section view of another example of a mechanical CPR device with an adjustable length, or telescoping, piston. FIG. 9A illustrates the adjustable piston 904 in its most retracted position and FIG. 9B illustrates the adjustable piston 904 in its most extended position. The mechanical CPR device includes a main portion, also referred to herein as a central unit 900. A compression device 902 is housed within the central unit 900. The compression device 902 includes an adjustable piston 904 that can extend from the central unit 900 toward a patient. The adjustable piston 904 can be manually extended in length to adjust to different chest of heights of patients. When set to a desired height, the adjustable piston 904 can then be extended and retracted by the compression device 902.

The adjustable piston 904 can include an outer piston sleeve 906, which is connected to the compression device 902 and an inner piston sleeve 908 that can move relative to the outer sleeve 906 in the direction of arrow 910. In FIGS. 9A and 9B, the compression device includes a motor 912 attached to a ball screw shaft 914, which is attached to the outer sleeve 906. Rotation of the motor 912 causes the adjustable piston 904 to extend toward and retract from the patient in the direction of arrow 910 which is along axis 924. While a motor 912 and ball screw shaft 914 are illustrated in FIG. 9, any linear motion actuator may be used as the compression device 902.

Figure 10:
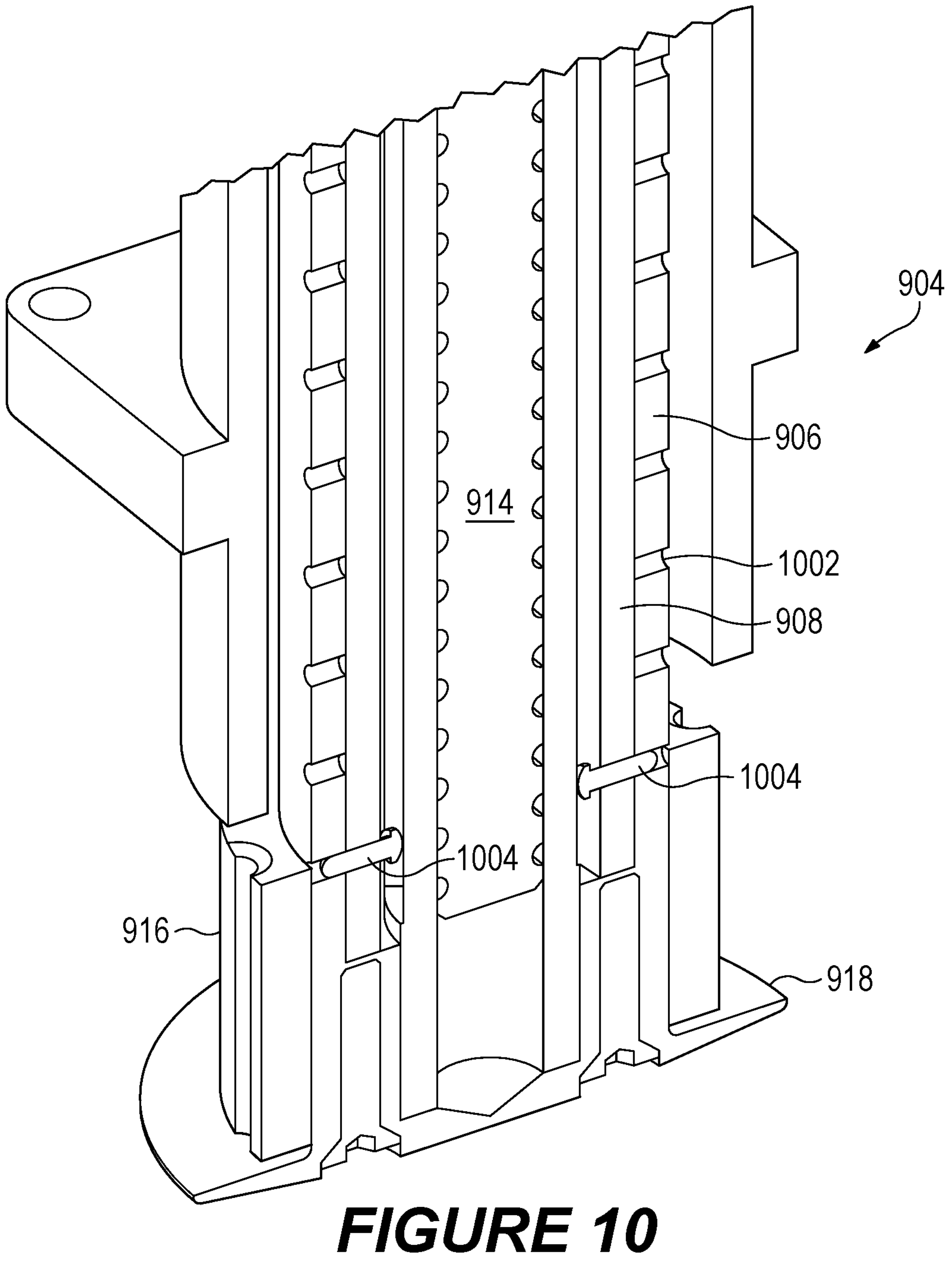
FIG. 10 depicts a cross-section view of a locking mechanism for the adjustable piston of FIGS. 9A and 9B according to some examples of the present disclosure.
Figure 11:
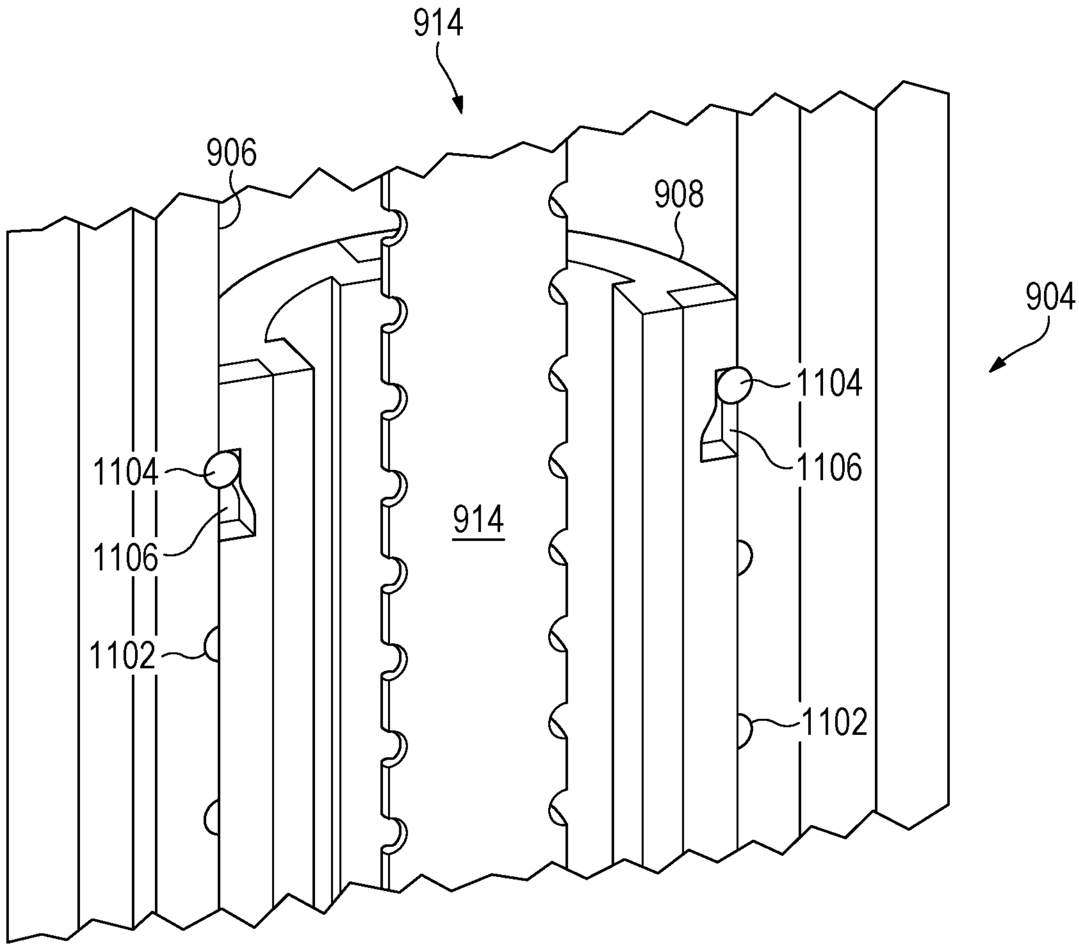
FIG. 11 depicts a cross-section view of another locking mechanism for the adjustable piston of FIGS. 9A and 9B according to some examples of the present disclosure.

The adjustable piston 904 can be locked at a particular length by locking the outer sleeve 906 to the inner sleeve 908. The adjustable piston 904 may include an internal locking mechanism, including a pin or ball bearing, as shown in FIGS. 10 and 11. The adjustable piston 904 can include a locking mechanism 916, such as a handle or grip, for locking the outer sleeve 906 and inner sleeve 908 in a position or unlocking the inner sleeve 908 relative to the outer sleeve 906 to set a desired position of the inner sleeve 908 relative to the outer sleeve 906. The locking mechanism 916 may be permanently affixed to the inner sleeve 908 and cause rotation of the inner sleeve 908 to lock or unlock the inner sleeve 908 relative to the outer sleeve 906.

An end of the adjustable piston 904 may contain a suction cup 918 to temporarily attach to a patient. However, in some examples, instead of suction cup 918, an adhesive pad may be provided or the end of the adjustable piston 904 may be flat and not temporarily attach to the patient.

The adjustable piston 904 can be extended along the axis 924 to a length that is approximately double the height of the central unit 900. That is, since the adjustable piston 904 is telescoping, almost the entire outer sleeve 906 can be extended out from the central unit 900 until near the end of the screw shaft 914. Enough distance needs to be left on the screw shaft 914 to provide a compression to the patient once the adjustable piston 904 is touching or attached to the chest of the patient. The inner sleeve 908 can extend to a length that is approximately the length of the outer sleeve 906, as illustrated in FIG. 9B.

While FIGS. 9A and 9B show the adjustable piston 904 in its most retracted position and most extended position, as will be understood by one skilled in the art, the adjustable piston 904 can be set at any length in between. When the desired position of the adjustable piston 904 has been reached, the locking mechanism 916 can be rotated to the locked position and the motor 912 can perform compressions to extend and retract the adjustable piston 904 by rotating the screw shaft 914.

The compression device 902 may also include one or more distance sensors in some examples. In the example of FIGS. 9A and 9B, a distance radar sensor 920 and a distance laser sensor 922 are included. However, examples of the disclosure do not require both sensors and/or these particular types of sensors. Any type of sensor that can measure a distance may be used.

In the examples of FIGS. 9A and 9B, the distance radar sensor 920 can measure the distance from a bottom surface of the compression device 902 to the patient. The distance laser sensor 922 can measure the distance from the bottom surface of the compression device 902 to the suction cup 918, if attached. The outputs of the sensors 920 and/or 922 can be sent to a controller to determine the stroke of the piston based on the adjusted length of the adjustable piston 904, similar to block 820 in FIG. 8.

FIG. 10 is cross-section cut away view of the adjustable piston 904 illustrating a pin bearing locking mechanism. For example, the outer sleeve 906 may include a number of cavities 1002 on an inner surface to receive a spring-loaded pin 1004 on the outer surface of the inner sleeve 908. The inner sleeve 908 can be rotated relative to the outer sleeve 906 to push the spring-loaded pin 1004 inward against the spring (not shown). The inner surface of the outer sleeve 906 can include portions without cavities 1002 which can allow the inner sleeve 908 to move relative to the outer sleeve 906. When the inner sleeve 908 is in the desired position, the inner sleeve can be rotated until the spring-loaded pin 1004 engages with a cavity in the outer sleeve 906.

FIG. 11 is a cross-section view of the adjustable piston 904 having a ball bearing locking mechanism. In this example, the outer sleeve 906 includes cavities 1102 or indents which can be received by a ball 1104. The inner sleeve 908 can be pushed up and twisted so that the ball 1104 is received in the cavity 1106, which releases the inner sleeve 908 from the outer sleeve 906. The inner sleeve 908 can be positioned as desired and then the inner sleeve 908 can be rotated and locked so that the ball 1104 is received at the cavity 1102 closest to the desired position.

While a pin bearing and ball bearing locking mechanism are shown in FIGS. 10 and 11, examples of the disclosure may use any locking mechanism that can set a height between the outer sleeve 906 and the inner sleeve 908. The adjustable piston 904 is able to extend from the central unit 900 to almost or approximately double the height of the central unit 900 to be able to accommodate more patient sizes in the compression device 100.

Figure 12A:
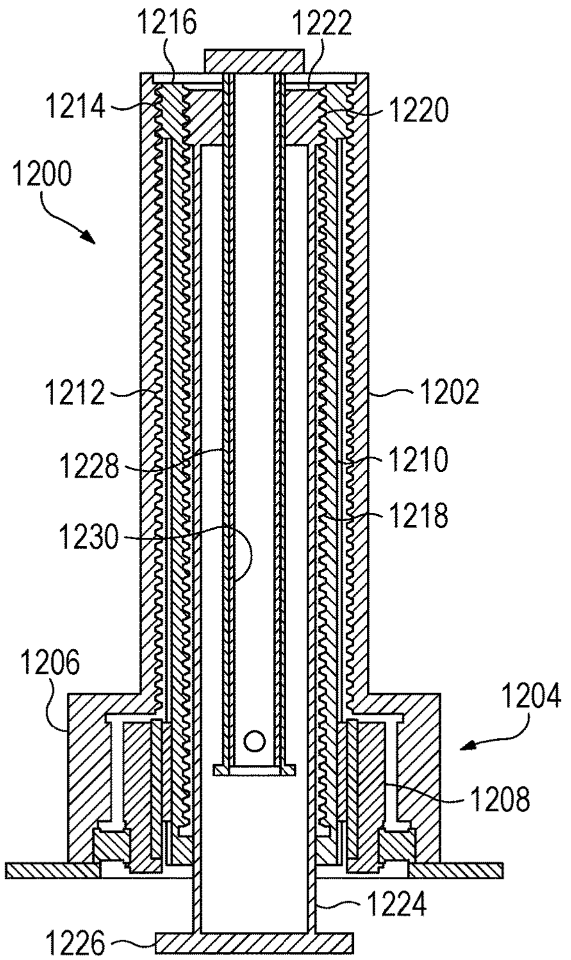
FIGS. 12A and 12B depict a cross-section view of an adjustable piston according to some examples of the present disclosure.
Figure 12B:
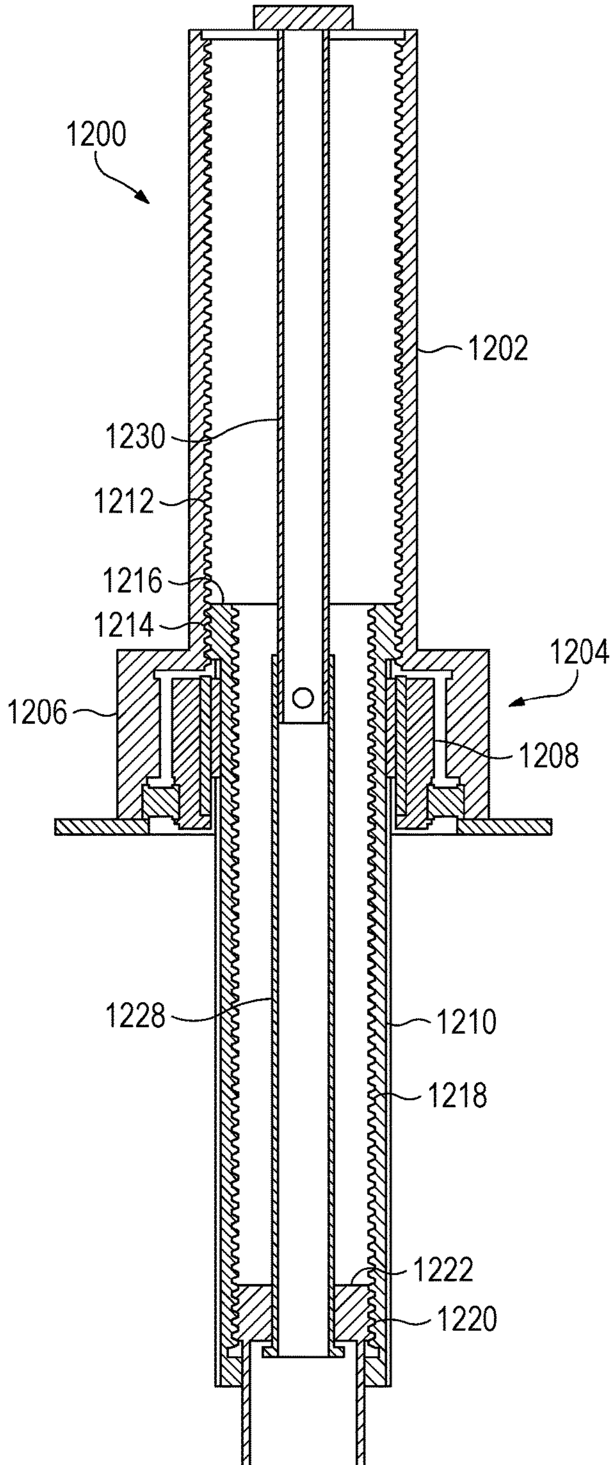

FIGS. 12A and 12B illustrate a cross-section view of another example of an adjustable length compression device. For ease of illustration, FIGS. 12A and 12B only illustrate the compression component of the compression device, but as will be understood by one skilled in the art, the example illustrated in FIGS. 12A and 12B can be used in the main portion 115 of the compression device 100. FIG. 12A illustrates a fully retracted compression device 1200 and FIG. 12B illustrates a fully extended compression device 1200.

The compression device 1200 includes a two-stage telescopic linear piston that can extended longer than the height of the compression device 1200. The compression device 1200 can include a central housing 1202, a motor 1204, such as a frameless brushless torque motor, which includes a fixed outer stator 1206 and a hollow rotor 1208. The rotor 1208 can have axial splines on the inner surface which can engage and transfer torque to a cylinder 1210, also referred to as a compression housing, that has similar splines along the outer surface (not shown). This can allow torque to be transferred from the rotor 1208 to the cylinder 1210 independent of the axial position of the cylinder 1210.

The central housing 1202 is fixed to the stator 1206 and includes threads 1212 on an inner surface that engage with threads 1214 on an outer surface of cylinder 1210. The threads 1214 on the outer surface of cylinder 1210 do not need to be on the entire outer surface. As seen in FIGS. 12A and 12B, the cylinder 1210 may include a protrusion or lip 1216 on the top which includes the threads 1214.

The cylinder 1210 also includes threads 1218 on an inner surface that are in contact with corresponding threads 1220 on an outer surface of a plunger 1222. The plunger 1222 is connected to an inner cylinder 1224, also referred to as a piston, which has an external pressure pad 1226. As will be understood by one skilled in the art, the end of the piston could have a suction cup in other examples, or a suction cup could attach to the pressure pad 1226.

The plunger 1222 is also in contact with sleeve 1228 and a center rod 1230. The sleeve 1228 can slide axially on the center rod 1230 and in the plunger 1222. The center rod is fixed to the central housing 1202. The cross-section of the sleeve 1228 and the center rod 1230 are non-circular to prevent the plunger 1222 from rotating when the cylinder 1210 is rotating.

The thread 1218 on the inner surface of the cylinder 1210 is an opposite direction of the thread 1212 on the inside of the central housing 1202. When the rotor 1208 rotates, the cylinder 1210 will also rotate and move up or down with respect to the stator 1206 by means of the threads 1214 of the central housing 1202. In the same rotation, the inner cylinder 1224 will also move up or down with respect to the cylinder 1210 by means of the threads 1218. Therefore, the rotation of the rotor 1208 is converted to a linear motion of the inner cylinder 1224 and the pressure pad 1226 when it compresses a patient. The cylinder 1210 also moves axially. The total movement of the external pressure pad 1226 is within the range of approximately 100% to 200% of the height of compression device 1200.

During operation, a user can select to set a height of the compression device 1200 according to a chest height of the patient. A user may manually set the height, such as by pressing a button (not shown) to rotate the motor 1204 in a first direction to retract the pressure pad 1226 or a second direction to extend the pressure pad 1226. When the pressure pad 1226 is at the desired position, compressions can begin. In some examples, the user may operate the compression device 1200 by a remote device and the instructions are received wirelessly by a controller (not shown) in the compression device 1200.

In an alternative example, the pressure pad 1226 may include a sensor. A user may select a mode to automatically set a height of the compression device 1200. A controller may instruct the motor 1204 to rotate until the sensor on the pressure pad 1226 indicates the pressure pad is in contact and/or attached to a chest of a patient. The height of the compression device 1200 can be recorded and used to begin compressions, similar to block 820 in FIG. 8.

Figure 13:
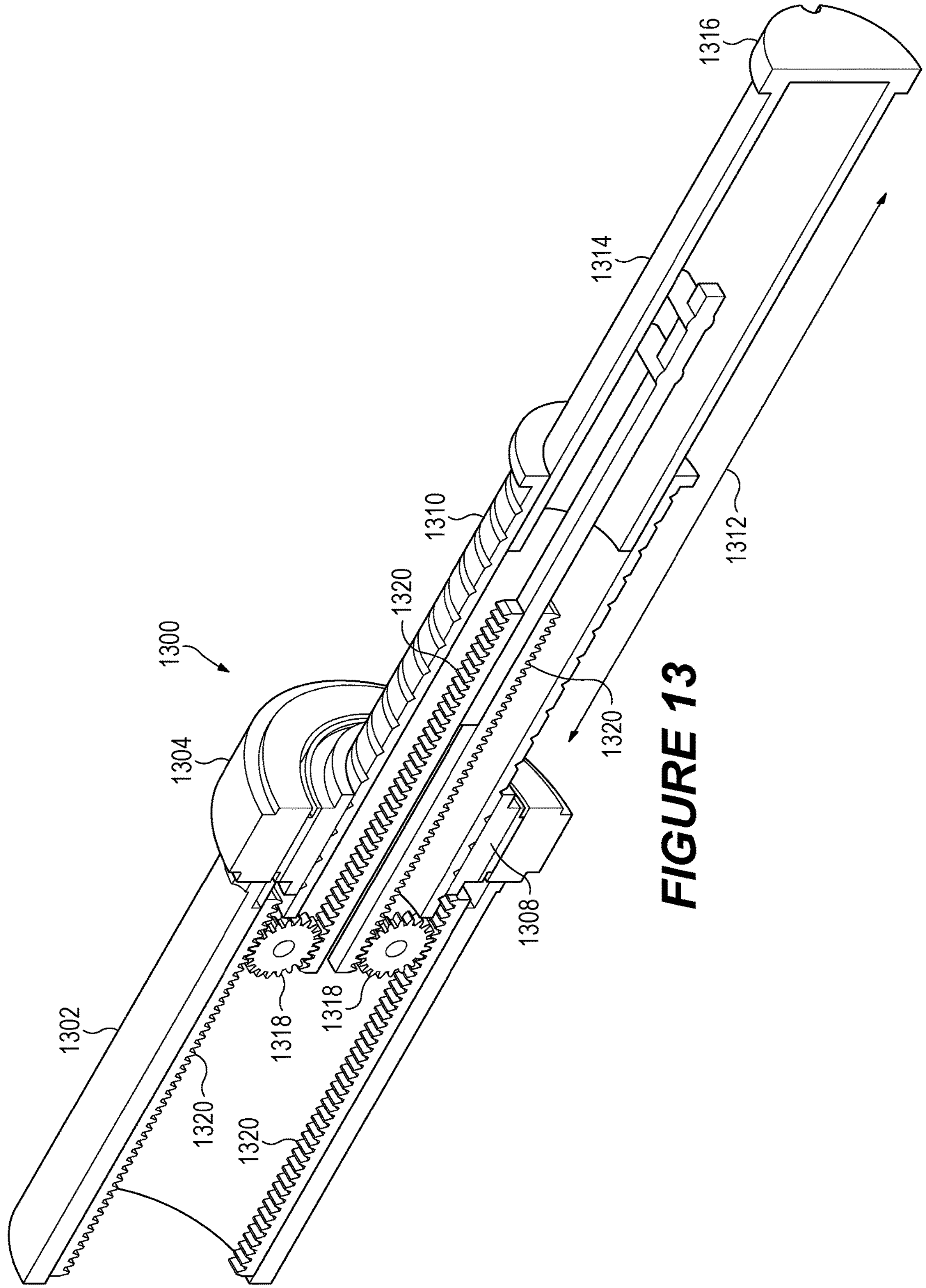
FIG. 13 depicts a cross-section view of another adjustable piston according to some examples of the present disclosure.

FIG. 13 illustrates a cut-away view of an alternative adjustable length compression device. For ease of illustration, FIG. 13 only illustrate the compression component of the compression device, but as will be understood by one skilled in the art, the example illustrated in FIGS. 12A and 12B can be used in the main portion 115 of the compression device 100.

The compression device 1300 includes a two-stage telescopic linear piston that can extended longer than the height of the compression device 1300. The compression device 1300 can include an outer housing 1302 that would be stored in the main portion 115, a motor that includes a fixed outer stator 1304 and a hollow rotor connected to a large diameter hollow ball nut 1308. In FIG. 13, the rotor and ball nut 1308 are shown as one component, but as will be understood by one skilled in the art, two separate components may be provided. The rotor and ball nut 1308 rotate around a hollow spindle or screw 1310 causing the screw 130 to extend outwards relative to the outer housing 1302. The rotation of the rotor and ball nut 1308 create a linear motion of the spindle 1310 relative to the outer housing 1302 and along an arrow 1312.

A piston 1314 fits within the hollow spindle 1310 and the piston 1314 has an end portion 1316 which can attach to or touch a patient's chest, or can have a suction cup or other device attached. The piston 1314 is connected to the outer housing 1302 by a spur gear 1318 and pinion 1320 mechanism.

The linear movement of the spindle 1310 also causes the spur gears 1318 to turn and can extend the piston relative to the spindle 1310. This results in a simultaneous telescopic extension of the piston 1314 with respect to the spindle 1310 and the spindle 1310 relative to the outer housing 1302.

The rotor and hollow ball nut 1308 can rotate to extend the length of the compression device 1300 until the end portion 1316 attaches to or touches as patient. The compression device 1300 can rotate the rotor and hollow ball nut 1308 to extend and retract the spindle 1310 and piston 1314 toward the patient along arrow 1312 to provide compressions. The total movement end portion 1316 is within the range of approximately 100% to 200% of the height of outer housing 1302.

As will be understood by one skilled in the art, a controller can instruct the rotor and hollow ball nut 1308 to rotate to cause the compression device 1300 to either extend to a desired height and/or to provide compressions. Although not shown, the compression device 1300 can also include a sensor for detecting the height and that information can be used to for performing compressions, similar to block 820 in FIG. 8.

Figure 14:
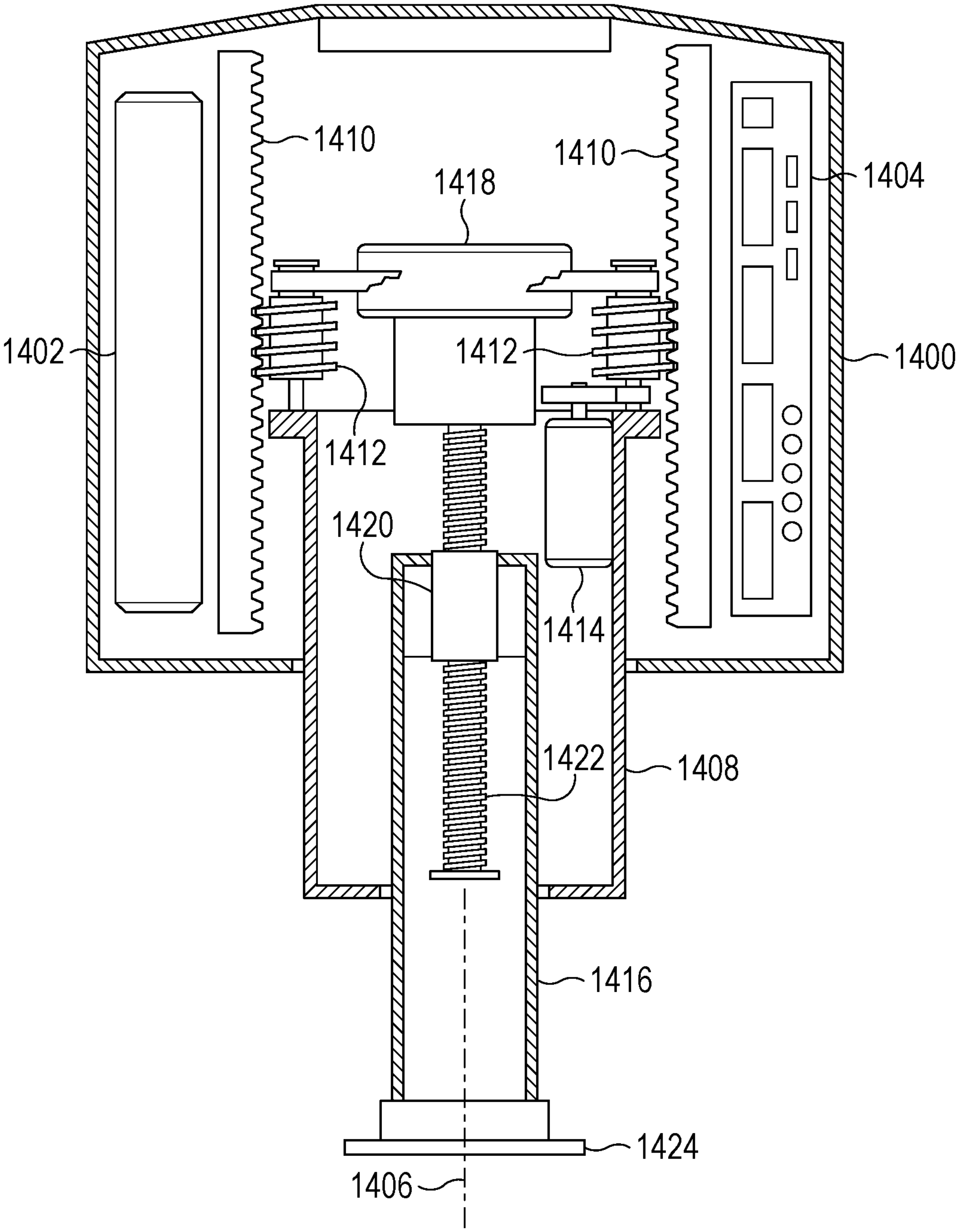
FIG. 14 depicts a cross-section view of an adjustable telescopic compression unit according to some examples of the present disclosure.

FIG. 14 illustrates another example of an adjustable length compression device. For ease of illustration again, only the compression component is illustrated in FIG. 14. However, as will be understood by one of ordinary skill in the art, central housing 1400 can be used in place of main portion 1115 in FIG. 1. A central housing 1400 can include a number of additional components not discussed in detail below, such as a battery 1402 and electronic circuitry 1404. The central housing 1400 has an axis 1406 extending toward a patient.

In this example, a compression mechanism 1408 is disposed in the central housing 1400. The compression mechanism 1408 can move relative to the central housing 1400 along the axis 1406. That is, the compression mechanism 1408 can extend and retract toward a patient by a driving component.

In some examples the driving component can be a worm drive to translate the compression mechanism 1408 along the axis 1406. One or more worms 1410 are provided in the central housing 1400. Worm gears 1412 are provided at the top portion of the compression mechanism 1408. The worm gears 1412 can be connected with a timing belt, illustrated in FIG. 15 and discussed below. A motor 1414, such as a planetary gear motor, is provided to rotate at least one of the worm gears 1412. As the worm gears 1412 rotate, they can move along the worms 1410 to move the compression mechanism along the axis 1406.

A piston 1416 can be extended and retracted from the compression mechanism 1408. A piston driving component can be included within the compression mechanism 1408, as shown in FIG. 14, to move the piston 1416 along the axis 1406 toward and away from the patient. In this example, the driving component moves along the axis 1406 with the compression mechanism 1408.

The piston 1416 can move separate from the compression mechanism 1408 along the axis 1406 to extend and retract from within the compression mechanism 1408 by the piston driving component. In some examples, the piston driving component could be located in the central housing 1400. In such examples, the driving component would not move with the compression mechanism 1408 but would be fixed to the central housing 1400.

The piston driving component is a linear actuator that can cause the piston to extend and retract from the compression mechanism 1408 toward and away from a patient. In the example shown in FIG. 14, the piston driving component includes a motor 1418 and the piston 1416 is attached to a ball bearing 1420 that moves up and down a screw shaft 1422 as the motor 1418 rotates the screw shaft 1422. However, as will be understood by one of ordinary skill in the art, other linear actuators may be used for the piston driving component. The piston 1416 includes an end portion 1424 which may have a suction cup attached or any other type of pad to provide compressions to a patient.

Figure 15:
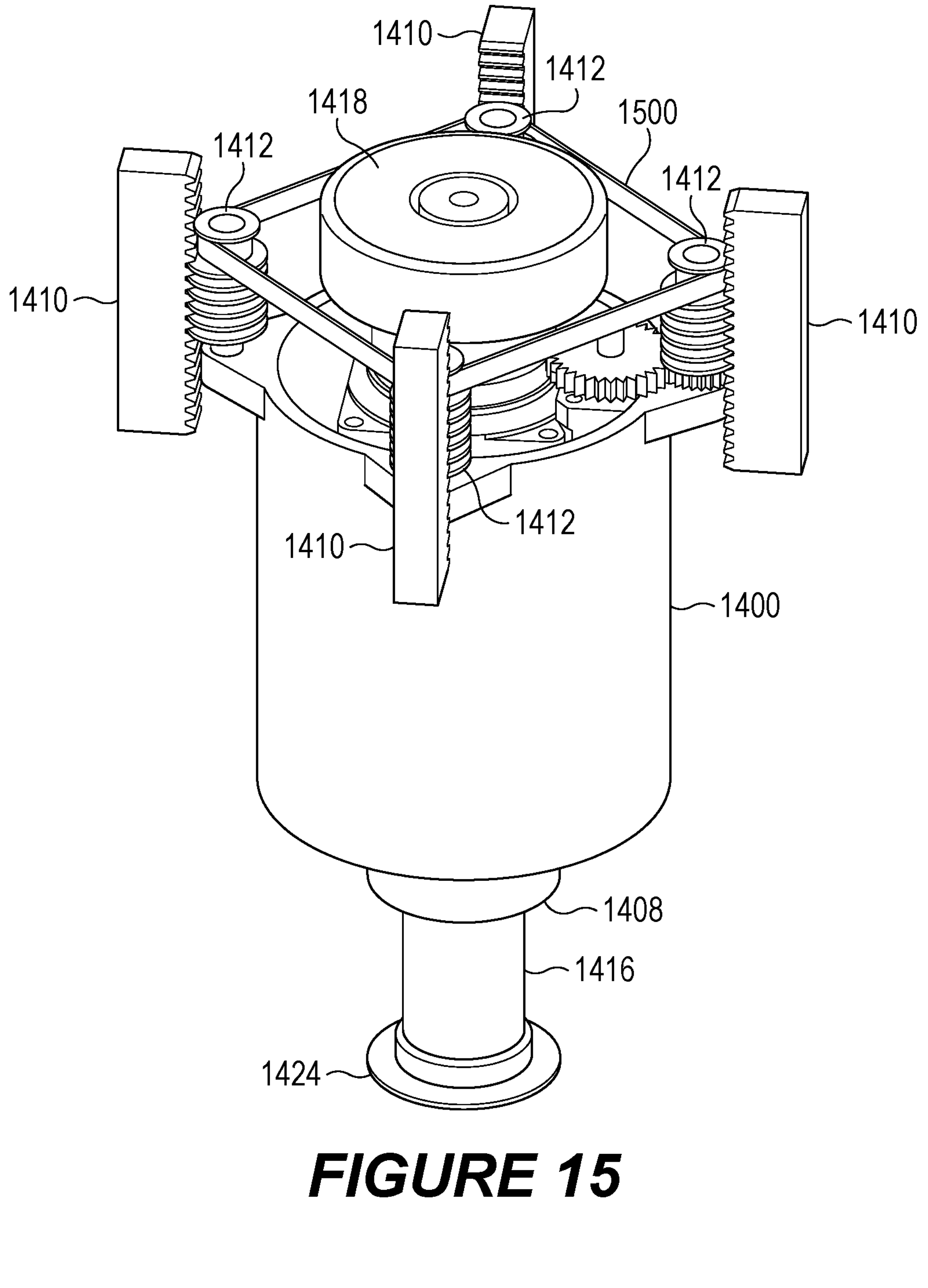
FIG. 15 depicts an isometric view of the top portion of the adjustable telescopic compression unit of FIG. 14.

FIG. 15 illustrates a perspective view of the compression mechanism 1408 and the worms 1410. As can be seen in FIG. 15, the compression mechanism 1408 can include a number of worm gears 1412 that interact with worms 1410 in the central housing 1400. A timing belt 1500 is attached to each of the worm gears 1412, which can ensure straight movement up and down so that the worm gears 1412 are rotating at the same rate by the motor 1415. The entire compression mechanism 1408 can extend and retract within the central housing 1400 by the worm drive. While a worm drive is illustrated in FIGS. 14 and 15, any type of linear actuator may be used to move the compression mechanism 1408 along the axis 1406. For example, ball screws may be used in place of the worm drive. Rather than worms 1410, one or more screw shafts could be provided and the compression mechanism 1408 could be attached to ball bearings that move along the screw shafts. A timing belt may still be provided to ensure the ball bearings rotate at the same speed if multiple screw shafts are used.

Using the example of FIGS. 14 and 15, the compression mechanism 1408 can extend from the central housing 1400. Further, the piston 1416 can then extend from the compression mechanism 1408. When used in place of the main portion 115 of FIG. 1, the compression mechanism 1408 can be extended toward a patient until the end portion 1424 touches or attaches to a patient. If the full extension of the compression mechanism 1408 is not long enough, then the piston 1416 can be further extended until the end portion 1424 is touching or attached to a patient. The piston driving component can then extend and retract the piston 1416 to provide compressions.

Similar to the example of FIGS. 12A and 12B, during operation, a user can select to set a height of the compression device according to a chest height of the patient. A user may manually set the height, such as by pressing a button to cause one or both of the driving components to cause the compression mechanism 1408 and/or the piston 1416 to extend or retract. In some examples, the compression mechanism 1408 may move first until at the fully extended position. In other examples, the compression mechanism 1408 and the piston 1416 may move in coordination. When the end portion 1424 is at the desired position, compressions can begin.

In an alternative example, the end portion 1424 may include a sensor. A user may select a mode to automatically set a height of the compression device. A controller in the electronic circuitry 1404 may instruct one or both of the driving components to move the compression mechanism 1408 and/or the piston 1415. The height of the compression device can be recorded and used to begin compressions.

Figure 16:
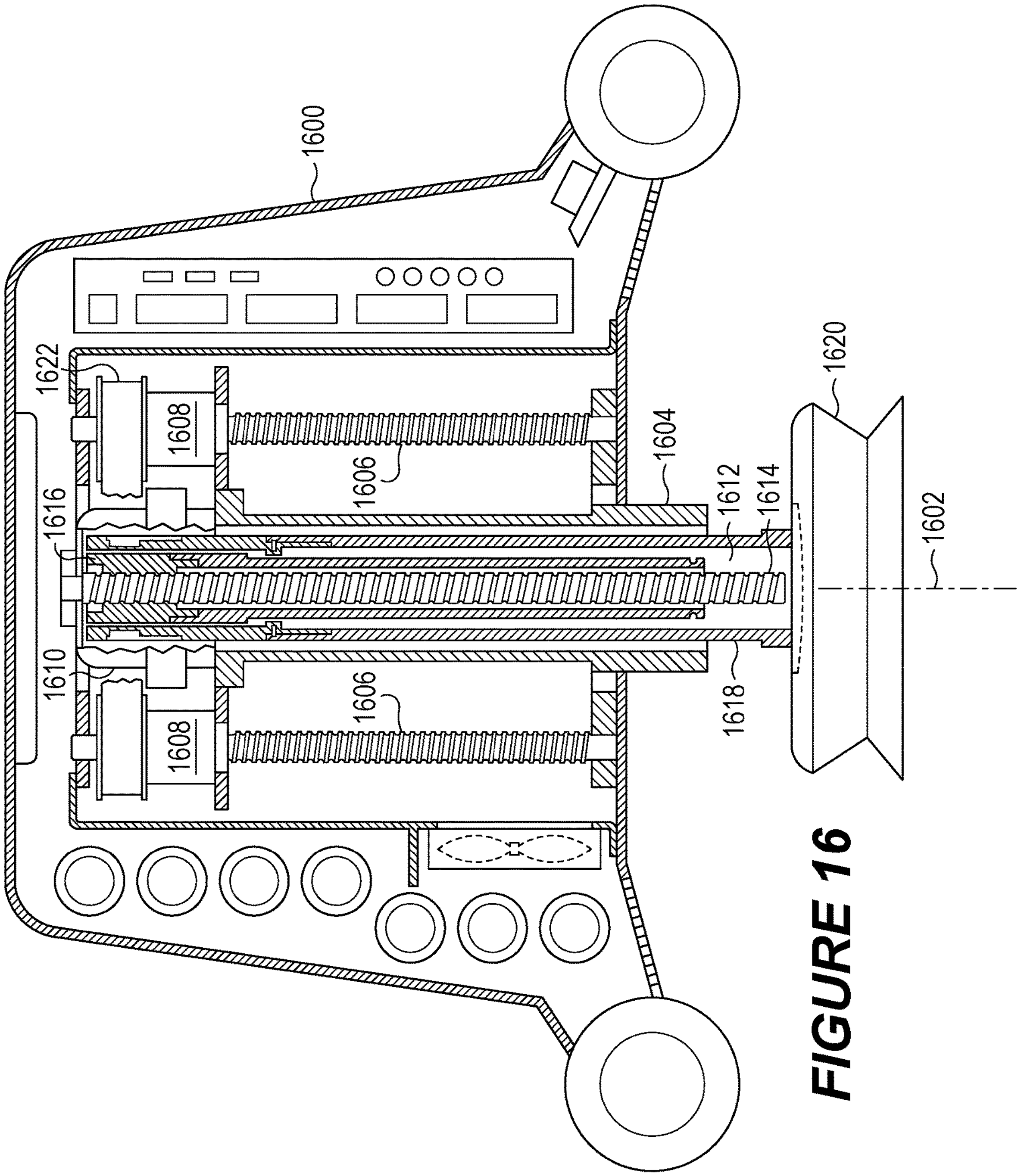
FIG. 16 depicts a cross-section view of another adjustable telescopic compression unit according to some examples of the present disclosure.

FIG. 16 is another example of an adjustable length compression device that can be used in place of main portion 116 in FIG. 1. A central housing 1600 can include a number of additional components not discussed in detail below, such as a battery and electronic circuitry. The central housing has an axis 1602 extending toward a patient.

In this example, a compression mechanism 1604 is disposed in the central housing 1600. The compression mechanism 1604 can move relative to the central housing 1600 along the axis 1602. That is, the compression mechanism 1604 can extend and retract toward a patient by a driving component.

In this example, the driving component includes two screw shafts 1606 in the central housing 1600 attached to the compression mechanism 1604 by two ball bearings 1608. A motor 1610 causes the ball bearings 1608 to rotate to move the compression mechanism 1604 along the axis 1602.

A piston 1612 can be extended and retracted from the compression mechanism 1604. In this example, the piston is attached to a screw shaft 1614 by a ball bearing 1616. The motor 1610 also rotates the ball bearing 1616 when rotating ball bearings 1608 which causes the compression mechanism 1604 and the piston 1612 to extend and retract at the same time. Ball bearings 1608 and 1616 may be attached by a timing belt 1622. Although not shown, as will be readily understood by one skilled in the art, a second motor could be provided to drive the ball bearings 1608 separately from the ball bearing 1616. In such an example, a timing belt may be provided to ensure that the ball bearings 1616 are rotating at the same speed.

In this example, the piston 1612 may include a telescoping portion 1618 that can be manually extended from the piston 1612 to provide even greater length to the compression mechanism 1604. The telescoping portion 1618 can be manually extended using any known technique, including, but not limited to, those discussed above in FIGS. 10 and 11.

During operation, the motor 1610 rotates until a suction cup 1620 or any other end portion of the piston 1612 touches or attaches to a patient. The motor 1610 can then extend and retract both the compression mechanism 1604 and the piston 1612 in conjunction to provide compressions.

Figure 17:
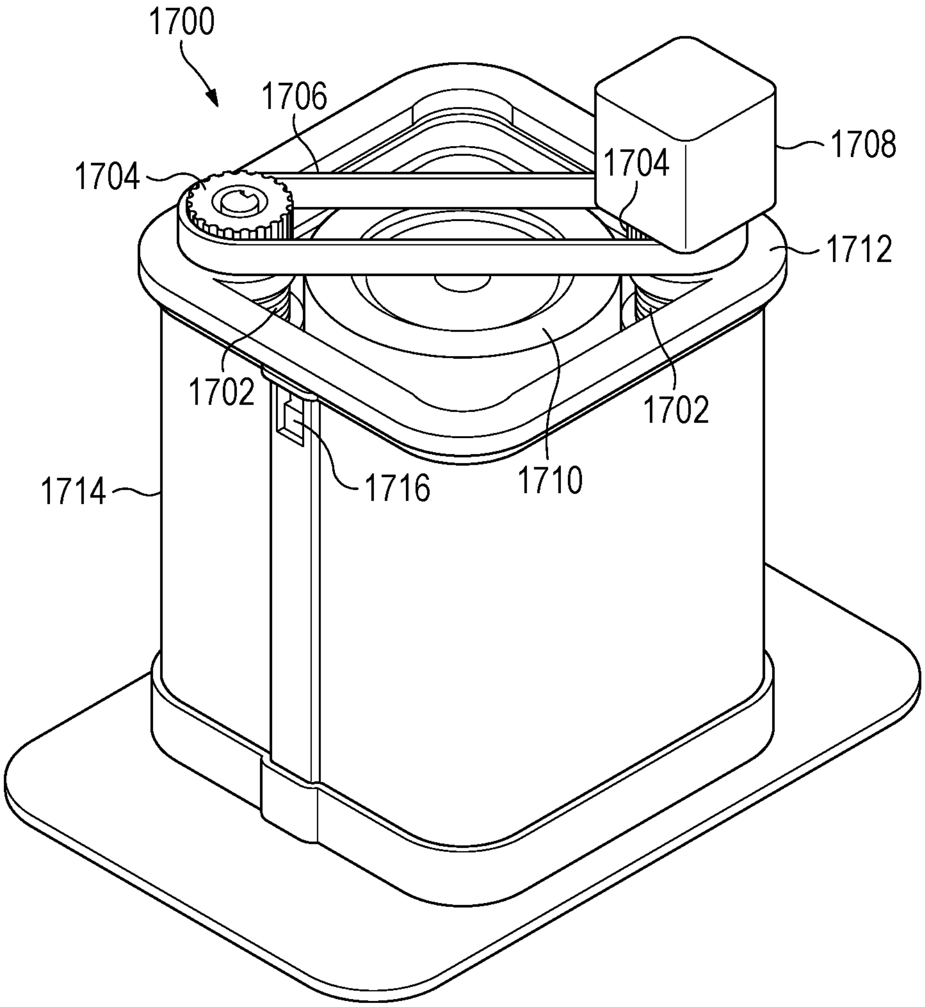
FIG. 17 depicts an isometric view of another adjustable telescopic compression unit according to some examples of the present disclosure.

FIG. 17 is another example of a compression mechanism 1700 that can be located in main portion 115 of FIG. 1. For each of illustration, the main portion 115, or a central housing, is not shown in FIG. 17. A central housing can include a number of additional components not discussed in detail below, such as a battery and electronic circuitry.

The compression mechanism 1700 includes a cover 1714 two telescopic screw shafts 1702 connected with a cog 1704 and belt mechanism 1706. A motor 1708 rotates the screw shafts 1702 by rotation of the cogs 1704. Rotational of the cogs 1704 causes the telescopic screw shafts 1702 to extend in a linear motion. Another motor 1710 may be provided within the compression mechanism 1700 as well. A plate 1712 can be connected to the frame of the compression device and can hold and/or support the motor 1708 and the cogs 1704.

Figure 18:
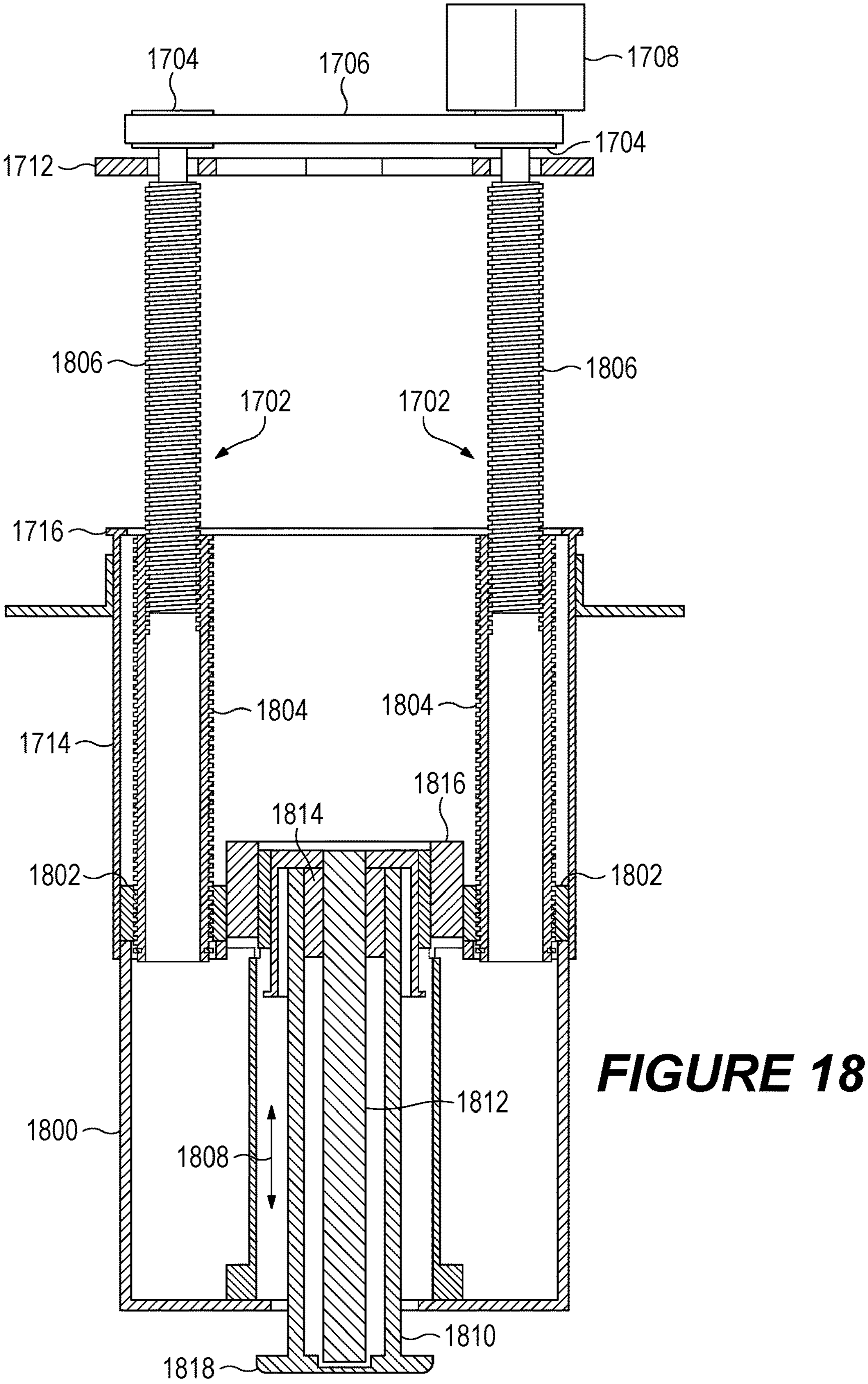
FIG. 18 depicts a cross-section view of the adjustable telescopic compression unit of FIG. 17.

FIG. 18 illustrates a cross-section view of the compression mechanism of FIG. 17. The compression mechanism 1700 includes an inner cover 1800 connected by a plate 1802 to an outer screw shaft 1804 of the telescopic screw shafts 1702. The plate 1802 includes two threaded holes that interact with the outer screw shafts 1804. The outer screw shaft 1804 is hollow and includes threads on an interior surface to interact with threads on inner screw shaft 1806. Rotation of the cogs 1704 causes the outer screw shaft 1804 to move up or down the inner screw shaft 1804, and causes the plate 1802 to move down the outer screw shaft 1804. So as the motor 1708 rotates, the cogs 1704 will rotate the outer screw shaft 1804 and the inner screw shaft 1806. The outer screw shaft 1804 can be prohibited from separating from the inner screw shaft 1806 at the most extended position, in some examples. The plate 1802 travels up or down depending on the direction the motor 1708 rotates. The inner cover 1800 includes protrusions 1716 that can engage with cover 1714 to ensure cover 1714 moves with the inner cover 1800.

The compression mechanism also includes a piston 1810. The piston 1810 is connected to a screw shaft 1812 by a ball bearing 1814. The screw shaft 1812 is connected to a second motor 1816 which rotates to drive the piston 1810 to extend and retract from the inner cover 1800. The piston 1810 includes an end portion 1818 that touches or attaches to a patient. The end portion 1818, in some examples, may be a suction cup or can allow a suction cup to be attached.

The motor 1710 can be instructed to rotate by a controller to position the end portion 1818 to attach to or touch a patient. If additional length is needed, the motor 1710 can rotate to extend the piston 1810 downward.

Figure 19:
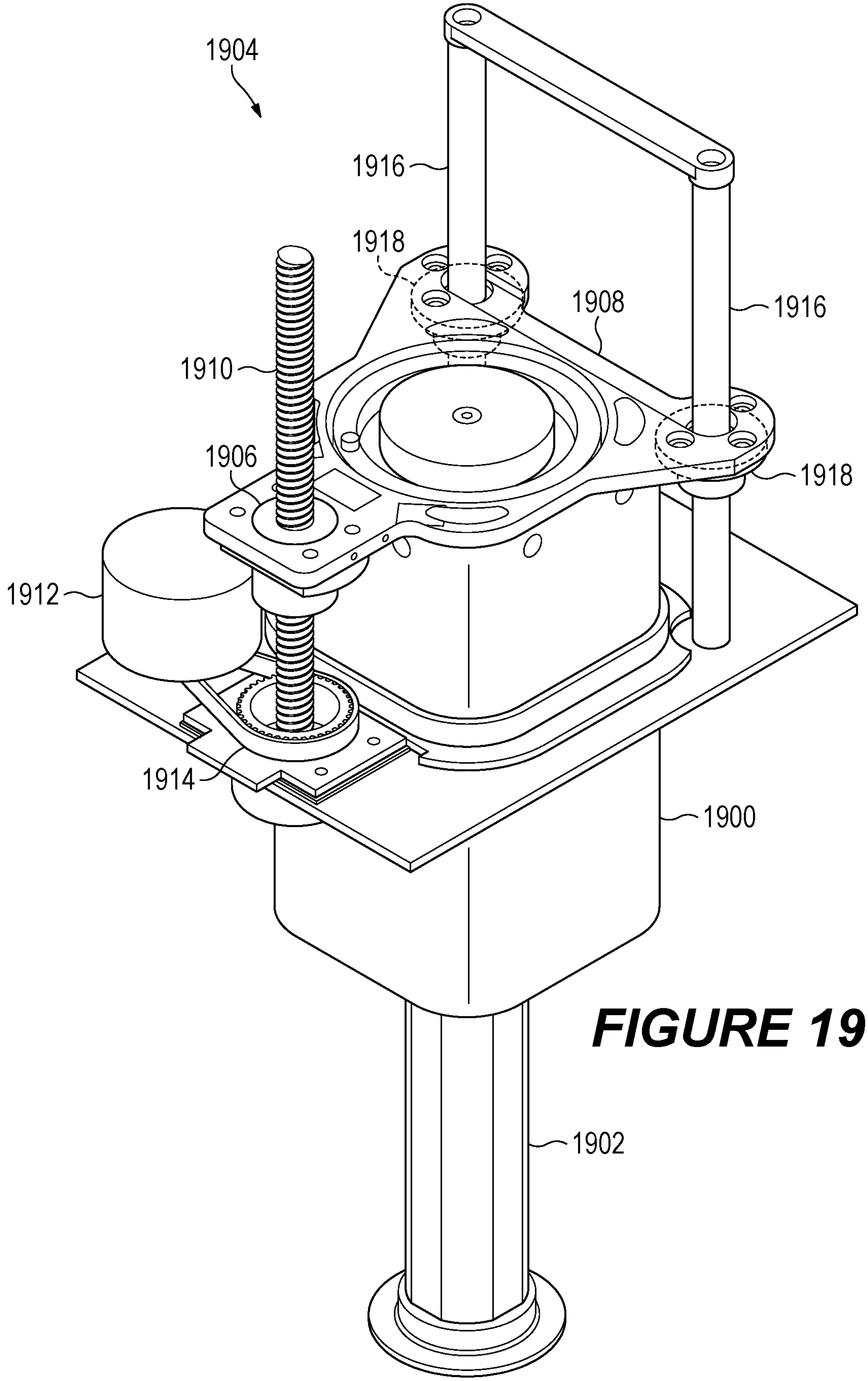
FIG. 19 depicts an isometric vide of another adjustable compression unit according to some examples of the present disclosure.

FIG. 19 illustrates another example for adjusting a compression mechanism 1900 relative to a patient. The compression mechanism 1900 can include any of the above-discussed compression mechanisms that can extend a piston 1902.

An assembly 1904 is provided to lower and raise the compression mechanism 1900. A ball nut 1906 can be attached to the compression mechanism 1900 by a plate 1908. A ball screw 1910 is driven by a motor 1912 and a belt 1914. On the other side of the assembly 1904, two slide shafts 1916 are provided. The plate 1908 can include two slide brushings 1918 that interact with the slide shafts 1916.

The motor 1912 rotates and causes the screw 1910 to rotate so the ball nut 1906 travels up or down the screw 1910, which causes the compression mechanism 1900 to move up and down. The compression mechanism 1900 can include any known type of compression mechanism 1900, such as driving the piston 1902 by a ball screw or any other linear actuator.

Figure 20A:
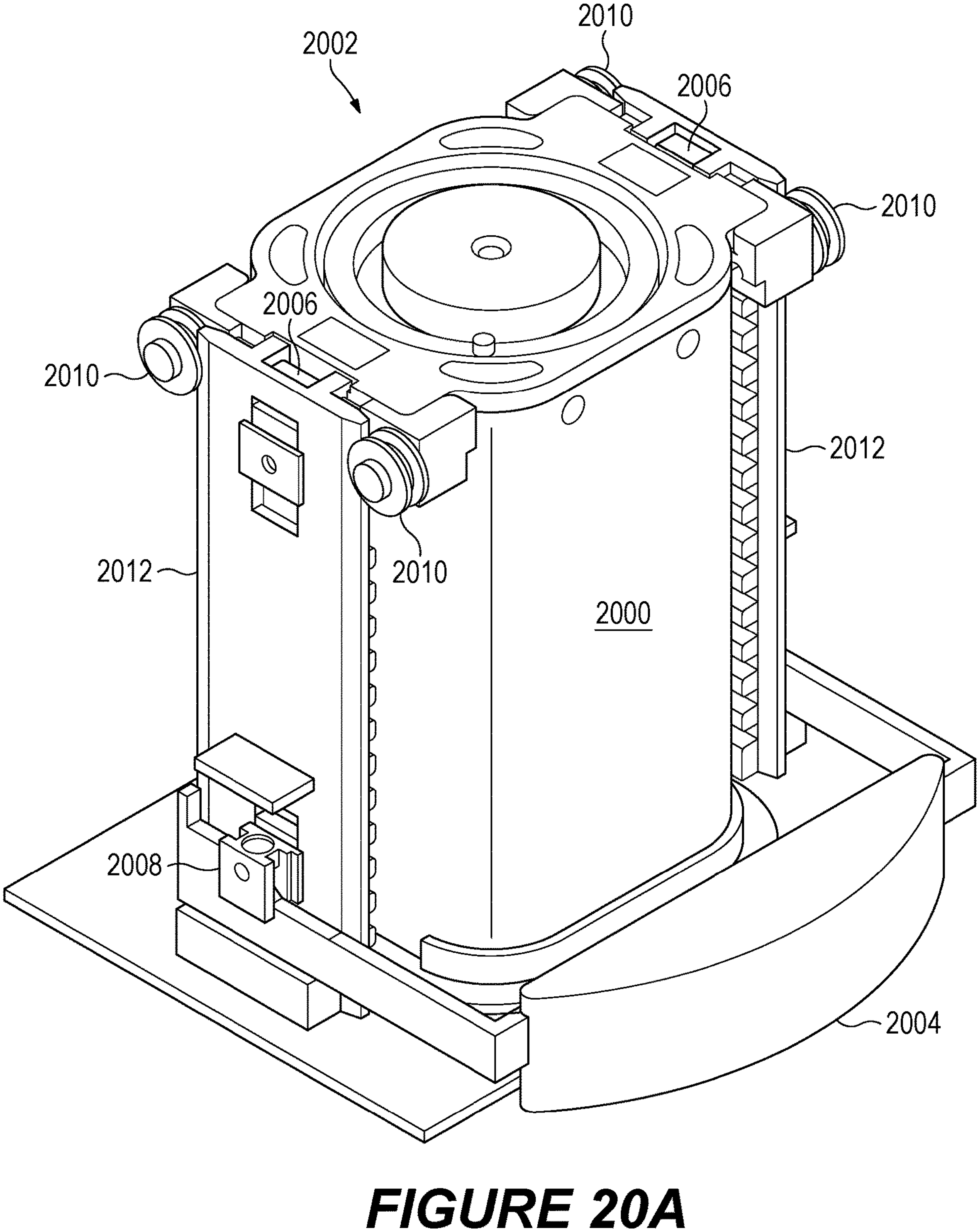
FIG. 20A depicts another adjustable compression unit according to some examples of the present disclosure and FIG. 20B depicts just the compression holder of FIG. 20A.
Figure 20B:
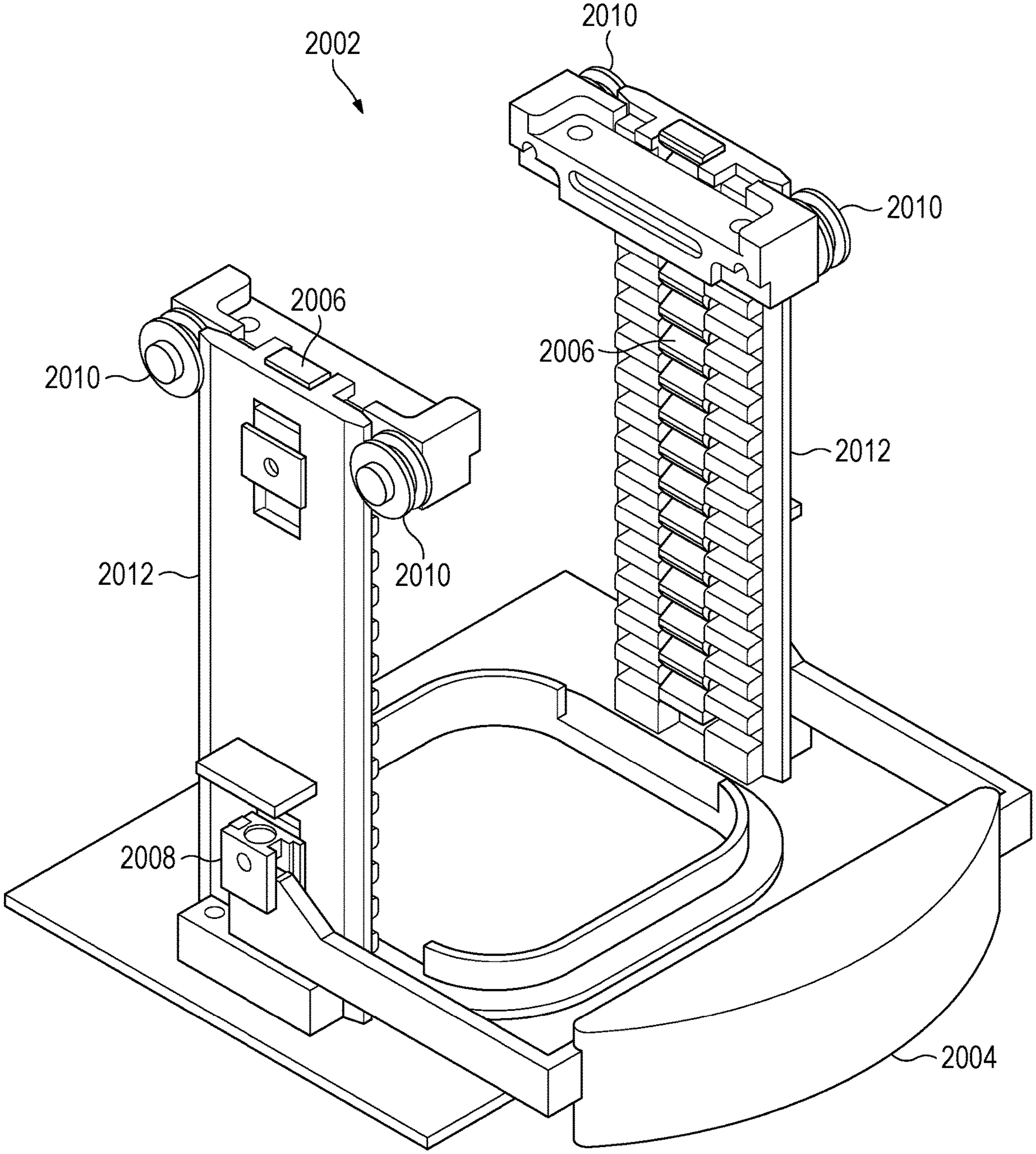

FIG. 20A illustrates a compression mechanism 2000 that can be extended manually from a compression mechanism holder 2002 in some examples and FIG. 20B illustrates the compression mechanism holder 2002 with the compression mechanism 2000 removed for ease of illustration.

A compression mechanism holder 2002 can include a handle 2004 that is accessible outside the compression device. The handle 2004 can be pulled to cause a release lever 2006 to release the compression mechanism 2000 from the holder 2002. The handle 2004 can include a cam mechanism to allow the handle 2004 to stay open until pushed back in to lock the compression mechanism 2000 to the holder 2002.

In FIG. 20A, the handle 2004 is in the locked position. In FIG. 20B, the unlocked position of the handle 2004 is illustrated. As the handle 2004 is pulled, the handle 2004 causes a projection or plate 2008 attached to the release lever 2006 to move upward, which causes the release lever 2006 to also move upward.

When release lever 2006 is unlocked, the compression mechanism 2000 can move toward and away from a patient relative to the compression mechanism holder 2002. In some examples, as shown in FIG. 20A, the compression mechanism 2000 can be attached to one or more guide rollers 2010. The guide rollers 2010 can slide along the sides 2012 of the compression mechanism holder 2002. The guide rollers 2010 assist with keeping the compression mechanism 2000 stable while moving along the sides 2012. While guide rollers 2020 are shown in FIGS. 20A and 20B, any type of stabilization mechanism may be used to keep the compression mechanism 2000 stable while traversing along the compression mechanism holder 2002.

Figure 21A:
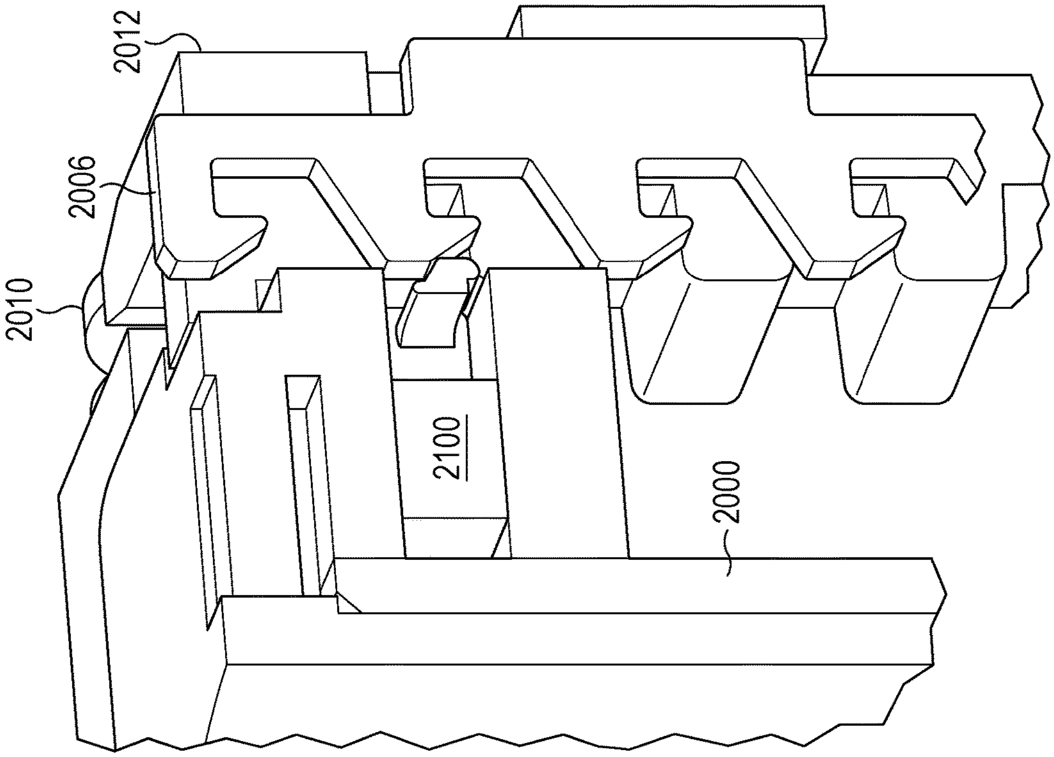
FIGS. 21A and 21B illustrate the locking mechanism of FIGS. 20A and 20B.
Figure 21B:
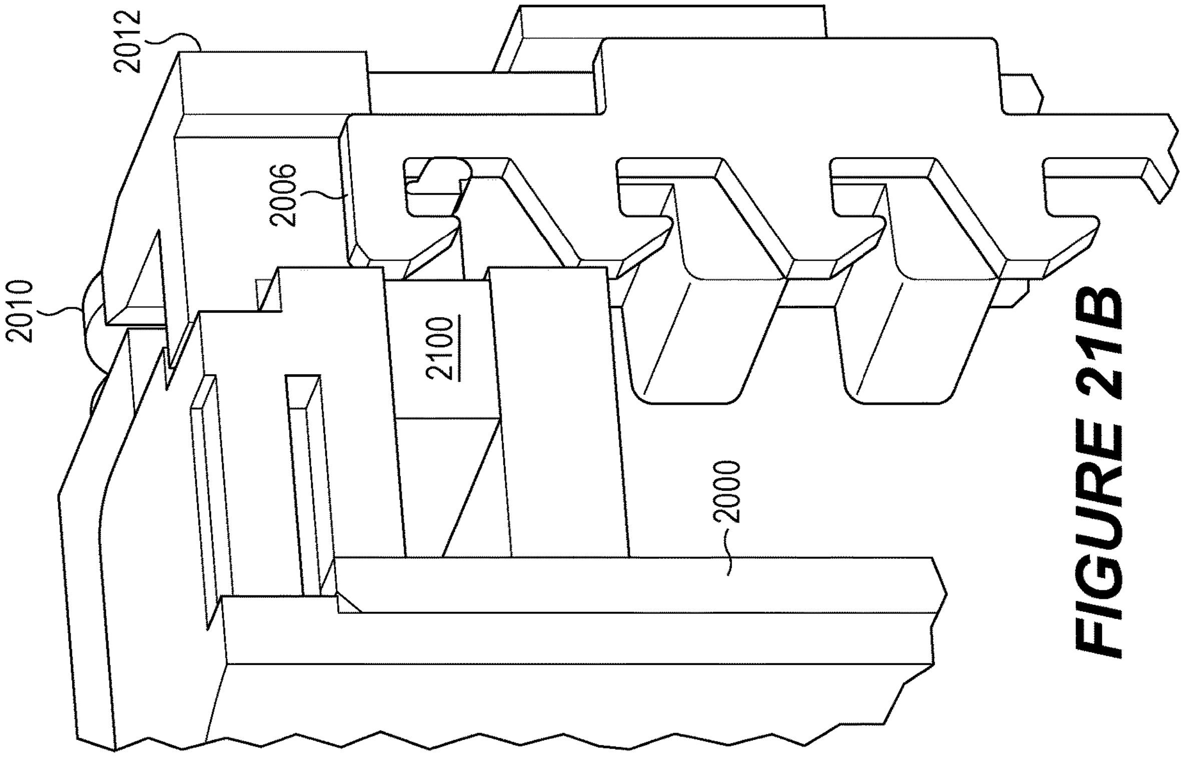

The compression mechanism 2000 can have a spring-loaded lock 2100 that can engage with the release lever 2006 lock the compression mechanism 2000 in place, as illustrated in FIGS. 21A and 21B. FIG. 21A illustrates when the handle 2004 has been pulled so that the release lever 2006 is in the unlocked position. FIG. 21B, on the other hand, illustrates when the handle 2004 is in the locked position and the lock 2100 is engaged with the lever 2006.

When the release lever 2006 is unlocked, the release lever 2006 moves upward. Pulling the handle 2004 and pushing the lever 2006 upwards causes the lock 2100 to release from the lever 2006. The spring-loaded lock 2100 is longer than the lever 2006. The sides 2012 of the compression mechanism holder 2002 include a step pattern that aligns with step pattern of the lever 2006 when in the locked position.

When the lever 2006 is in the unlocked position, the spring-loaded lock 2100 is prevented from entering any of the grooves of the lever 2006 as the step patterns of the sides 2012 and the lever 2006 no longer align. The compression mechanism 2000 can be guided by a user to a desired position and then the handle 2004 can be pushed in to cause the lever 2006 to drop in place, which then engages with the lock 2100, as shown in FIG. 21B.

In a number of embodiments discussed here, a suction cup has been described on the end of a piston. The suction cup can attach to a patient's torso so that, among other benefits, active decompression is possible. However, other mechanisms could be used to attach an end of the piston to a patient's torso. For example, a sticker plate configured to stick to patient's torso could be used on the end of the piston to attach to a patient's torso to the piston. In many of the above embodiments, the suction cup could be replaced with a sticker plate. Similarly, the suction cup in many of the above embodiments could be replaced with any number of other mechanisms that can attach to a patient's torso to the piston.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Relative terms, such as "about," "approximately," "substantially," and "generally," are used to indicate a possible variation of ±15% of a stated or understood value.

In general, the various features and processes described above may be used independently of one another, or may be combined in different ways. For example, this disclosure includes other combinations and sub-combinations equivalent to: extracting an individual feature from one embodiment and inserting such feature into another embodiment; removing one or more features from an embodiment; or both removing a feature from an embodiment and adding a feature extracted from another embodiment, while providing the advantages of the features incorporated in such combinations and sub-combinations irrespective of other features in relation to which it is described. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. Such computer program products may also take other forms in other embodiments. Accordingly, the present invention may be practiced with other computer system configurations.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

We claim:

1. A mechanical cardiopulmonary resuscitation (CPR) device, comprising:
- a central housing;
- a telescoping piston, extending from the central housing, the telescoping piston including:
  - an outer piston sleeve structured to move toward and away from the patient's torso and toward and away from the central housing, the outer piston sleeve having a proximal end toward the central housing, the proximal end of the outer piston sleeve configured to remain within the central housing when the telescoping piston is extending from the central housing, and
  - an inner piston sleeve within the outer piston sleeve structured to move relative to the outer piston sleeve toward and away from the patient's torso, the inner piston sleeve having a proximal end toward the central housing, the proximal end of the inner piston sleeve configured extend beyond the central housing when the telescoping piston is extending from the central housing;

a locking mechanism structured to lock the outer piston sleeve and the inner piston sleeve relative to each other; and a driving component configured to drive the telescoping piston to extend toward the patient's torso and retract the telescoping piston from the patient's torso when the outer piston sleeve and the inner piston sleeve are locked relative to each other by the locking mechanism, wherein the driving component includes a ball screw attached to the telescoping piston and a motor configured to rotate the ball screw to extend the telescoping piston toward the patient's torso and retract the piston from the patient's torso during compressions.

2. The mechanical CPR device of claim 1, wherein the locking mechanism rotates in a first direction to lock the outer piston sleeve and the inner piston sleeve relative to each other and in a second direction to unlock the outer piston sleeve and the inner piston sleeve relative to each other.

3. The mechanical CPR device of claim 2, wherein the locking mechanism includes a ball bearing.

4. The mechanical CPR device of claim 2, wherein the locking mechanism includes a pin bearing.

5. The mechanical CPR device of claim 2, wherein the locking mechanism is fixed to the inner piston sleeve.

6. The mechanical CPR device of claim 1, wherein the telescoping piston extends to approximately double a height of the central housing.

7. The mechanical CPR device of claim 1, further comprising a distance sensor configured to detect a length of the adjustable piston.

8. The mechanical CPR device of claim 7, wherein the distance sensor includes a distance radar sensor and a distance laser sensor.

9. The mechanical CPR device of claim 1, wherein the outer piston sleeve is structured to move toward and away from the patient's torso independently of the inner piston sleeve.

10. A mechanical cardiopulmonary resuscitation (CPR) device, comprising:

a central housing;

a driving component; and an adjustable, telescoping piston extending from the central housing including:

a first piston sleeve attached to the driving component and configured to extend and retract from a patient's torso and toward and away from the central housing, the first piston sleeve having a proximal end toward the central housing, the proximal end of the first piston sleeve configured to remain within the central housing when the adjustable, telescoping piston is extending from the central housing, a second piston sleeve movably attached to the first piston sleeve, the second piston sleeve structured to extend and retract from the patient's torso relative to the first piston sleeve, the second piston sleeve having a proximal end toward the central housing, the proximal end of the second piston sleeve configured extend beyond the central housing when the adjustable, telescoping piston is extending from the central housing, and a locking mechanism structured to lock the first piston sleeve and the second piston sleeve relative to each other;

wherein the driving component includes a ball screw attached to the first piston sleeve and a motor configured to rotate the ball screw to extend the first piston sleeve toward the patient's torso and retract the first piston sleeve from the patient's torso during compressions.

11. The mechanical CPR device of claim 10, wherein the locking mechanism rotates in a first direction to lock the first piston sleeve and the second piston sleeve relative to each other and in a second direction to unlock the first piston sleeve and the second piston sleeve relative to each other.

12. The mechanical CPR device of claim 11, wherein the locking mechanism includes a ball bearing.

13. The mechanical CPR device of claim 11, wherein the locking mechanism includes a pin bearing.

14. The mechanical CPR device of claim 11, wherein the locking mechanism is fixed to the second piston sleeve.

15. The mechanical CPR device of claim 10, wherein the adjustable piston extends to approximately double a height of the central housing.

16. The mechanical CPR device of claim 10, further comprising a distance sensor configured to detect a length of the adjustable piston.

17. The mechanical CPR device of claim 16, wherein the distance sensor includes a distance radar sensor and a distance laser sensor.

18. The mechanical CPR device of claim 10, wherein the first piston sleeve is structured to move toward and away from the patient's torso independently of the second piston sleeve.

* * * * *